US012500690B2

(12) United States Patent
Elshafie et al.

(10) Patent No.: US 12,500,690 B2
(45) Date of Patent: Dec. 16, 2025

(54) SIGNALING FOR ENABLING ERASURE CODING

(71) Applicant: QUALCOMM Incorporated, San Diego, CA (US)

(72) Inventors: Ahmed Elshafie, San Diego, CA (US); Ahmed Attia Abotabl, San Diego, CA (US); Marwen Zorgui, San Diego, CA (US); Gabi Sarkis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 422 days.

(21) Appl. No.: 18/069,977

(22) Filed: Dec. 21, 2022

(65) Prior Publication Data

US 2024/0214110 A1  Jun. 27, 2024

(51) Int. Cl.
*H04L 1/00* (2006.01)

(52) U.S. Cl.
CPC .......... *H04L 1/0025* (2013.01); *H04L 1/0009* (2013.01); *H04L 1/0057* (2013.01)

(58) Field of Classification Search
CPC ....... H04L 1/0023; H04L 1/0025; H04L 1/00; H04L 1/0001; H04L 1/001–0013; H04L 1/0056; H04L 1/0057; H04L 7/048; H04L 1/0009; H04L 1/0014; H04L 1/0046; H04L 1/0047; H04L 1/0075; H04L 2009/34

See application file for complete search history.

(56) References Cited

U.S. PATENT DOCUMENTS

| | | | | |
|---|---|---|---|---|
| 10,491,329 | B1 * | 11/2019 | Davis | H03M 13/373 |
| 2011/0087948 | A1 * | 4/2011 | Murakami | H03M 13/6356 714/755 |
| 2013/0339818 | A1 * | 12/2013 | Baker | G06F 3/0667 714/763 |
| 2017/0187398 | A1 * | 6/2017 | Trusov | H03M 13/151 |
| 2017/0286212 | A1 * | 10/2017 | Grube | H03M 13/1148 |
| 2018/0004600 | A1 * | 1/2018 | Danilov | G06F 11/1076 |
| 2018/0092104 | A1 * | 3/2018 | Sheng | H04W 74/08 |
| 2019/0050302 | A1 * | 2/2019 | Juniwal | G06F 3/0689 |

(Continued)

FOREIGN PATENT DOCUMENTS

| | | | | |
|---|---|---|---|---|
| WO | WO-2019023260 A1 * | 1/2019 | | G06F 11/1662 |
| WO | WO-2020086850 A1 * | 4/2020 | | H04L 29/08 |

*Primary Examiner* — Warner Wong
(74) *Attorney, Agent, or Firm* — Holland & Hart LLP

(57) ABSTRACT

Methods, systems, and devices for wireless communications are described. A wireless device may receive, from a network encoding device, an encoding capability message indicating one or more parameters associated with an erasure encoding and an erasure encoding type from a set of defined erasure encoding types. In some examples, the erasure encoding type is associated with an order between the erasure encoding and a low-density parity check (LDPC) encoding. The network encoding device may encode data in accordance with the one or more parameters and the erasure encoding type indicated in the encoding capability message and transmit a data message including the data encoded. As such, the wireless device may receive the data message and may decode the data of the data message in accordance with the one or more parameters and the erasure encoding type indicated in the encoding capability message.

28 Claims, 15 Drawing Sheets

(56) References Cited

U.S. PATENT DOCUMENTS

| | | | |
|---|---|---|---|
| 2019/0165809 A1* | 5/2019 | Tseng | H03M 13/1131 |
| 2019/0181887 A1* | 6/2019 | Banerjee | G06F 3/064 |
| 2019/0319749 A1* | 10/2019 | Cao | H04L 1/1819 |
| 2020/0220558 A1* | 7/2020 | Tseng | H03M 13/1111 |
| 2023/0085085 A1* | 3/2023 | Galbraith | H04L 1/0061 |
| | | | 714/776 |
| 2023/0125753 A1* | 4/2023 | Liu | H04L 47/283 |
| | | | 370/235 |
| 2023/0179324 A1* | 6/2023 | Sarkis | H04L 1/0011 |
| | | | 370/310 |

\* cited by examiner

SIGNALING FOR ENABLING ERASURE CODING

FIELD OF TECHNOLOGY

The following relates to wireless communications, including signaling for enabling erasure coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support signaling for enabling erasure coding. For example, the described techniques provide for network coding. Network coding can be used to increase system capacity and improve resource utilization. For example, a set of data blocks may be encoded in a message using network coding techniques and transmitted to a wireless device. In some examples, the encoded message may also include a linear combination of the set of data blocks. As such, if wireless device does not receive one or more of the data blocks, the wireless device may use the linear combination of the set of data blocks in combination with the received subset of data blocks to generate the data blocks that were not initially received.

In some examples, a network encoding device may perform various types or approaches of erasure encoding to encode a set of data blocks. As such, a network encoding device and a wireless device receiving encoded data may communicate one or more capability messages to identify which of the erasure encoding types to use. For example, the wireless device may transmit a decoding capability message indicating a capability to decode data in accordance with one or more of a set of erasure encoding types. In some examples, the network encoding device may transmit an encoding capability message indicating an erasure encoding type and one or more parameters associated with the erasure encoding type. The wireless device may receive a data message including data encoded in accordance with one of the erasure encoding types, and the wireless device may decode the data based on the erasure encoding type and the one or more parameters indicated in the encoding capability message.

A method for wireless communications at a wireless device is described. The method may include receiving, from a network encoding device, an encoding capability message indicating one or more parameters associated with an erasure encoding and an erasure encoding type from a set of multiple defined erasure encoding types, where the erasure encoding type is associated with an order between the erasure encoding and a low-density parity check (LDPC) encoding, receiving, from the network encoding device, a data message including data encoded in accordance with the encoding capability message, and decoding the data of the data message in accordance with the one or more parameters and the erasure encoding type indicated in the encoding capability message.

An apparatus for wireless communications at a wireless device is described. The apparatus may include a processor, memory coupled with the processor, and instructions stored in the memory. The instructions may be executable by the processor to cause the apparatus to receive, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding, receive, from the network encoding device, a data message including data encoded in accordance with the encoding capability message, and decode the data of the data message in accordance with the one or more parameters and the erasure encoding type indicated in the encoding capability message.

Another apparatus for wireless communications at a wireless device is described. The apparatus may include means for receiving, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding, means for receiving, from the network encoding device, a data message including data encoded in accordance with the encoding capability message, and means for decoding the data of the data message in accordance with the one or more parameters and the erasure encoding type indicated in the encoding capability message.

A non-transitory computer-readable medium storing code for wireless communications at a wireless device is described. The code may include instructions executable by a processor to receive, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding, receive, from the network encoding device, a data message including data encoded in accordance with the encoding capability message, and decode the data of the data message in accordance with the one or more parameters and the erasure encoding type indicated in the encoding capability message.

In some examples of the method, apparatuses, and non-transitory computer-readable medium described herein, the erasure encoding type may be a first erasure encoding type from the set of multiple defined erasure encoding types, and decoding the data of the data message may include operations, features, means, or instructions for performing an erasure decoding prior to a LDPC decoding in accordance with the first erasure encoding type.

In some examples of the method, apparatuses, and non-transitory computer-readable medium described herein, the erasure encoding type may be a second erasure encoding type from the set of multiple defined erasure encoding types, and decoding the data of the data message may include operations, features, means, or instructions for performing a LDPC decoding prior to an erasure decoding in accordance with the second erasure encoding type.

Some examples of the method, apparatuses, and non-transitory computer-readable medium described herein may further include operations, features, means, or instructions for transmitting, to the network encoding device, a decoding capability message indicating a set of one or more erasure encoding types from a set of multiple erasure encoding types supported by the wireless device for decoding, where receiving the encoding capability message may be based on transmitting the decoding capability message.

In some examples of the method, apparatuses, and non-transitory computer-readable medium described herein, the decoding capability message further includes an indication of a power reception capability of the wireless device.

In some examples of the method, apparatuses, and non-transitory computer-readable medium described herein, receiving the encoding capability message may include operations, features, means, or instructions for receiving an indication that one or more resource pools may be associated with respective erasure encoding types from the set of multiple defined erasure encoding types and respective sets of sidelink parameters, where the one or more resource pools may be used for sidelink between the wireless device and a second wireless device or the network encoding device.

In some examples of the method, apparatuses, and non-transitory computer-readable medium described herein, communicating, with the second wireless device via a first resource pool of the one or more resource pools, using a set of sidelink parameters associated with the first resource pool.

In some examples of the method, apparatuses, and non-transitory computer-readable medium described herein, the respective erasure encoding types may be a same respective erasure encoding type or different respective erasure encoding types, and the respective sets of sidelink parameters may be a same set of sidelink parameters or different sets of sidelink parameters.

In some examples of the method, apparatuses, and non-transitory computer-readable medium described herein, receiving the encoding capability message may include operations, features, means, or instructions for receiving an indication that one or more frequency sub-bands may be associated with respective erasure encoding types from the set of multiple defined erasure encoding types, where the one or more frequency sub-bands may be used for communications between the wireless device and the network encoding device.

In some examples of the method, apparatuses, and non-transitory computer-readable medium described herein, the one or more parameters indicate a decoding order for the data and the decoding order may be based on data priority for code blocks or code block groups (CBGs) of the data and the erasure encoding type.

In some examples of the method, apparatuses, and non-transitory computer-readable medium described herein, the one or more parameters indicate the erasure encoding type and decoding the data may be based on the erasure encoding type.

In some examples of the method, apparatuses, and non-transitory computer-readable medium described herein, the one or more parameters indicate one or more coefficients associated with a second erasure encoding type from the set of multiple defined erasure encoding types, power control information associated with the second erasure encoding type, or both and decoding the data may be based on the one or more coefficients, the power control information, or both.

In some examples of the method, apparatuses, and non-transitory computer-readable medium described herein, the erasure encoding type and the one or more parameters may be based on a signal to interference and noise ratio for a channel established between the wireless device and network coding device, one or more characteristics of the channel, or both.

In some examples of the method, apparatuses, and non-transitory computer-readable medium described herein may further include operations, features, means, or instructions for receiving the encoding capability message via a control information message, a medium access control (MAC) message, a radio resource control (RRC) message, or a combination thereof.

In some examples of the method, apparatuses, and non-transitory computer-readable medium described herein, the wireless device includes a user equipment (UE) or a network entity, and the network encoding device includes a UE or a network entity.

A method for wireless communications at a network encoding device is described. The method may include transmitting, an encoding capability message indicating one or more parameters associated with an erasure encoding and an erasure encoding type from a set of multiple defined erasure encoding types, where the erasure encoding type is associated with an order between the erasure encoding and a LDPC encoding, encoding data in accordance with the one or more parameters and the erasure encoding type indicated in the encoding capability message, and transmitting a data message including the data encoded in accordance with the encoding capability message.

An apparatus for wireless communications at a network encoding device is described. The apparatus may include a processor, memory coupled with the processor, and instructions stored in the memory. The instructions may be executable by the processor to cause the apparatus to transmit, an encoding capability message indicating one or more parameters associated with an erasure encoding and an erasure encoding type from a set of multiple defined erasure encoding types, where the erasure encoding type is associated with an order between the erasure encoding and a LDPC encoding, encode data in accordance with the one or more parameters and the erasure encoding type indicated in the encoding capability message, and transmit a data message including the data encoded in accordance with the encoding capability message.

Another apparatus for wireless communications at a network encoding device is described. The apparatus may include means for transmitting, an encoding capability message indicating one or more parameters associated with an erasure encoding and an erasure encoding type from a set of multiple defined erasure encoding types, where the erasure encoding type is associated with an order between the erasure encoding and a LDPC encoding, means for encoding data in accordance with the one or more parameters and the erasure encoding type indicated in the encoding capability message, and means for transmitting a data message including the data encoded in accordance with the encoding capability message.

A non-transitory computer-readable medium storing code for wireless communications at a network encoding device is described. The code may include instructions executable by a processor to transmit, an encoding capability message indicating one or more parameters associated with an erasure encoding and an erasure encoding type from a set of multiple defined erasure encoding types, where the erasure encoding type is associated with an order between the erasure encoding and a LDPC encoding, encode data in accordance with the one or more parameters and the erasure encoding type indicated in the encoding capability message, and transmit a data message including the data encoded in accordance with the encoding capability message.

In some examples of the method, apparatuses, and non-transitory computer-readable medium described herein, the erasure encoding type may be a first erasure encoding type from the set of multiple defined erasure encoding types, and encoding the data of the data message may include operations, features, means, or instructions for performing the erasure encoding prior to a LDPC encoding in accordance with the first erasure encoding type.

In some examples of the method, apparatuses, and non-transitory computer-readable medium described herein, the erasure encoding type may be a second erasure encoding type from the set of multiple defined erasure encoding types, and encoding the data of the data message may include operations, features, means, or instructions for performing a LDPC encoding prior to the erasure encoding in accordance with the second erasure encoding type.

Some examples of the method, apparatuses, and non-transitory computer-readable medium described herein may further include operations, features, means, or instructions for receiving, from one or more wireless devices, respective decoding capability messages indicating a set of one or more erasure encoding types from a set of multiple erasure encoding types supported by a respective wireless device of the one or more wireless devices for decoding, where transmitting the encoding capability message may be based on receiving the respective decoding capability messages.

In some examples of the method, apparatuses, and non-transitory computer-readable medium described herein, the respective decoding capability messages further include an indication of a power reception capability of the respective wireless device.

In some examples of the method, apparatuses, and non-transitory computer-readable medium described herein, receiving the respective decoding capability messages may include operations, features, means, or instructions for receiving, from a first wireless device, a first decoding capability message indicating support to decode data in accordance with a first erasure encoding type from the set of multiple defined erasure encoding types and a second erasure encoding type from the set of multiple defined erasure encoding types and receiving, from a second wireless device, a second decoding capability message indicating support to decode data in accordance with the first erasure encoding type where the erasure encoding type indicated in the encoding capability message may be the first erasure encoding type based on the first wireless device and the second wireless device indicating capability to decode data in accordance with the first erasure encoding type.

In some examples of the method, apparatuses, and non-transitory computer-readable medium described herein, transmitting the encoding capability message may include operations, features, means, or instructions for transmitting an indication that one or more resource pools may be associated with respective erasure encoding types from the set of multiple defined erasure encoding types and respective sets of sidelink parameters, where the one or more resource pools may be used for sidelink between a first wireless device and a second wireless device or the network encoding device.

In some examples of the method, apparatuses, and non-transitory computer-readable medium described herein, transmitting the encoding capability message may include operations, features, means, or instructions for transmitting an indication that one or more frequency sub-bands may be associated with respective erasure encoding types from the set of multiple defined erasure encoding types, where the one or more frequency sub-bands may be used for communications between network encoding device and one or more wireless devices.

In some examples of the method, apparatuses, and non-transitory computer-readable medium described herein, the one or more parameters indicate a decoding order for the data and the decoding order may be based on data priority for code blocks or CBGs of the data and the erasure encoding type.

In some examples of the method, apparatuses, and non-transitory computer-readable medium described herein, the one or more parameters includes indicate the erasure encoding type.

In some examples of the method, apparatuses, and non-transitory computer-readable medium described herein, the one or more parameters indicate one or more coefficients associated with a second erasure encoding type from the set of multiple defined erasure encoding types, power control information associated with the second erasure encoding type, or both and encoding the data may be based on the one or more coefficients, the power control information, or both.

In some examples of the method, apparatuses, and non-transitory computer-readable medium described herein, selecting the one or more parameters associated with the erasure encoding and the erasure encoding type may include operations, features, means, or instructions for selecting, via layer 3 (L3) or layer 2 (L2), the one or more parameters, down selecting the one or more parameters from L3 or L2 to L2, and configuring, via layer 1 (L1), the one or more parameters into a single set of parameters in L1.

In some examples of the method, apparatuses, and non-transitory computer-readable medium described herein, the data includes a set of blocks and the method, apparatuses, and non-transitory computer-readable medium may include further operations, features, means, or instructions for receiving, from one or more first wireless devices, respective blocks that include the set of blocks, where encoding the data may be based on receiving the respective blocks from the one or more first wireless devices and transmitting, to one or more second wireless devices, the data message including the data based on receiving the respective blocks from the one or more first wireless devices.

DETAILED DESCRIPTION

In some examples, one or more wireless devices may operate in accordance with one or more network coding techniques. Network coding can be used to increase system capacity and improve resource utilization. For example, a set of data blocks may be encoded in a message using network coding techniques and transmitted to a wireless device. In some examples, the encoded message may include a linear combination of the set of data blocks. As such, if a wireless device, such as a user equipment (UE) or a network entity, does not receive one or more of the data blocks, the wireless device may use the linear combination of the set of data blocks in combination with the received subset of data blocks to generate the data blocks that were not initially received. In some examples, a network encoding device may perform various erasure encoding types, or implement various approaches to erasure encoding, to encode the set of data blocks. However, the reliability of each of the various types of erasure encoding may change based on the type of data encoded, the channel used to transmit the data, the order in which the data blocks are decoded, or a combination thereof.

According to the techniques described herein, a network encoding device and wireless device receiving encoded data may communicate one or more capability messages to identify which of the erasure encoding types to use. For example, the wireless device may transmit a decoding capability message indicating a capability to decode data in accordance with one or more erasure encoding types of a set of erasure encoding types. In some examples, the network encoding device may transmit an encoding capability message indicating an erasure encoding type and one or more parameters associated with the erasure encoding type. As such, the wireless device may receive a data message including encoded data and decode the data based on the erasure encoding type and the one or more parameters indicated in the encoding capability message. In some examples, the network encoding device may receive multiple decoding capability messages from multiple network devices and configure sidelink communications between the multiple wireless devices based on the multiple decoding capability messages.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to signaling for enabling erasure coding.

Figure 1:
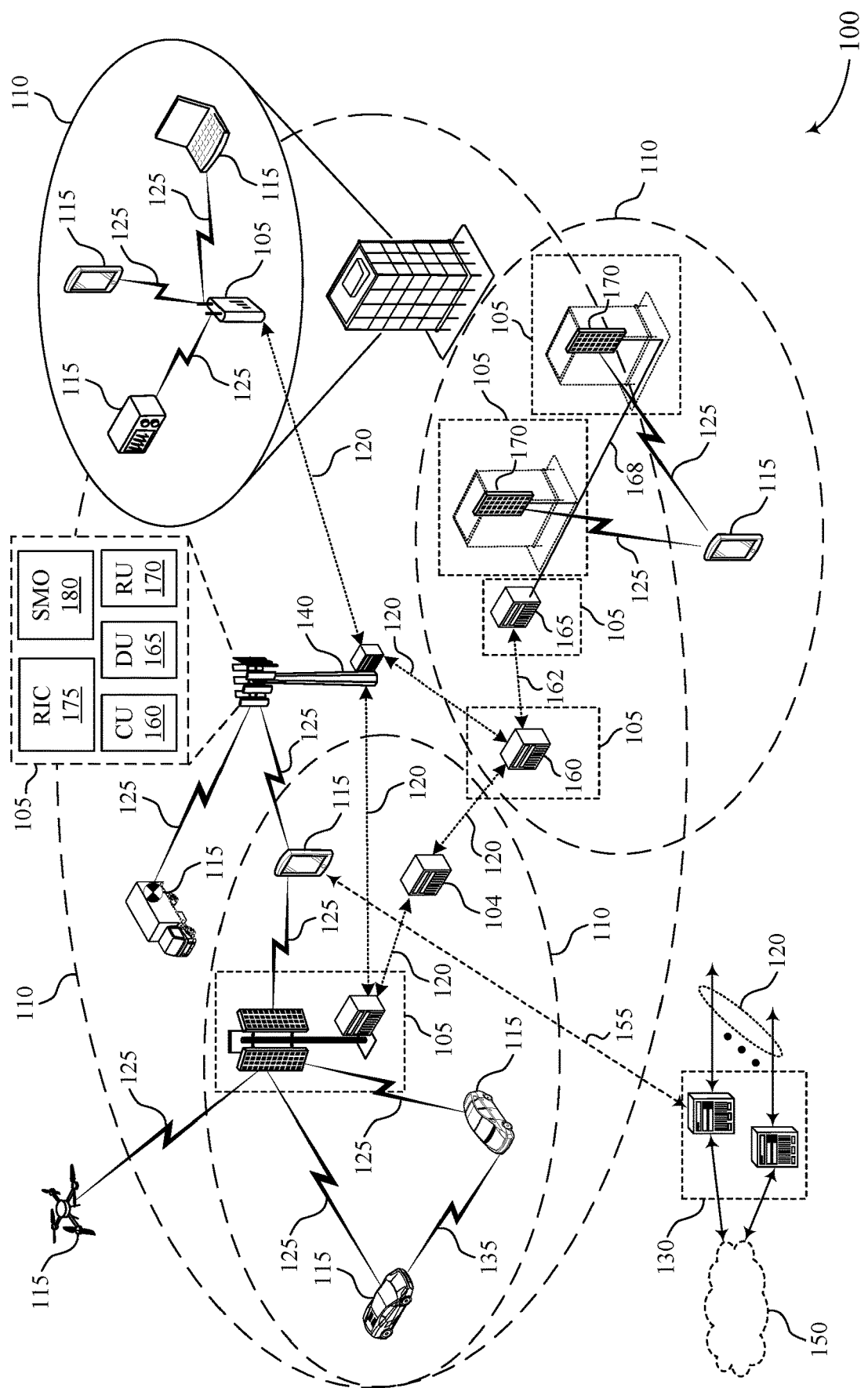
FIG. 1 illustrates an example of a wireless communications system that supports signaling for enabling erasure coding in accordance with one or more aspects of the present disclosure.

FIG. 1 illustrates an example of a wireless communications system 100 that supports signaling for enabling erasure coding in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support signaling for enabling erasure coding as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, one or more wireless devices may operate in accordance with one or more network coding techniques. Network coding can be used to increase system capacity and improve resource utilization. For example, a network entity 105 or a UE 115 may be an example of a network encoding device that may encode a set of data blocks in a message using network coding techniques and transmit the message to a wireless device. In some examples, the encoded message may include a linear combination of the set of data blocks. As such, if the wireless device does not receive one or more of the data blocks, the wireless device may use the linear combination of the set of data blocks in combination with the received subset of data blocks to generate the data blocks that were not initially received. In some examples, a network encoding device may perform various erasure encoding types to encode the set of data blocks.

In some examples, the network encoding device and wireless device receiving encoded data may communicate one or more capability messages to identify which of a set of erasure encoding types to use. For example, the wireless device may transmit a decoding capability message indicating capability to decode data in accordance with one or more of a set of erasure encoding types. In some examples, the set of erasure encoding types may be associated with an order between the erasure encoding technique used and a low-density parity check (LDPC) encoding. For example, in accordance with a first erasure encoding type, the network encoding device may perform an erasure encoding technique prior to LDPC encoding. Additionally, or alternatively, in accordance with a first erasure encoding type, the network encoding device may perform LDPC encoding prior to an erasure encoding technique.

In some examples, the network encoding device may transmit an encoding capability message indicating the erasure encoding type and one or more parameters associated with the erasure encoding type. As such, the wireless device may receive a data message including encoded data and decode the data in accordance with the erasure encoding type and the one or more parameters indicated in the encoding capability message. In some examples, the network encoding device may receive multiple decoding capability messages from multiple network devices and configure sidelink communications between the multiple wireless devices based on the multiple decoding capability messages.

Figure 2:
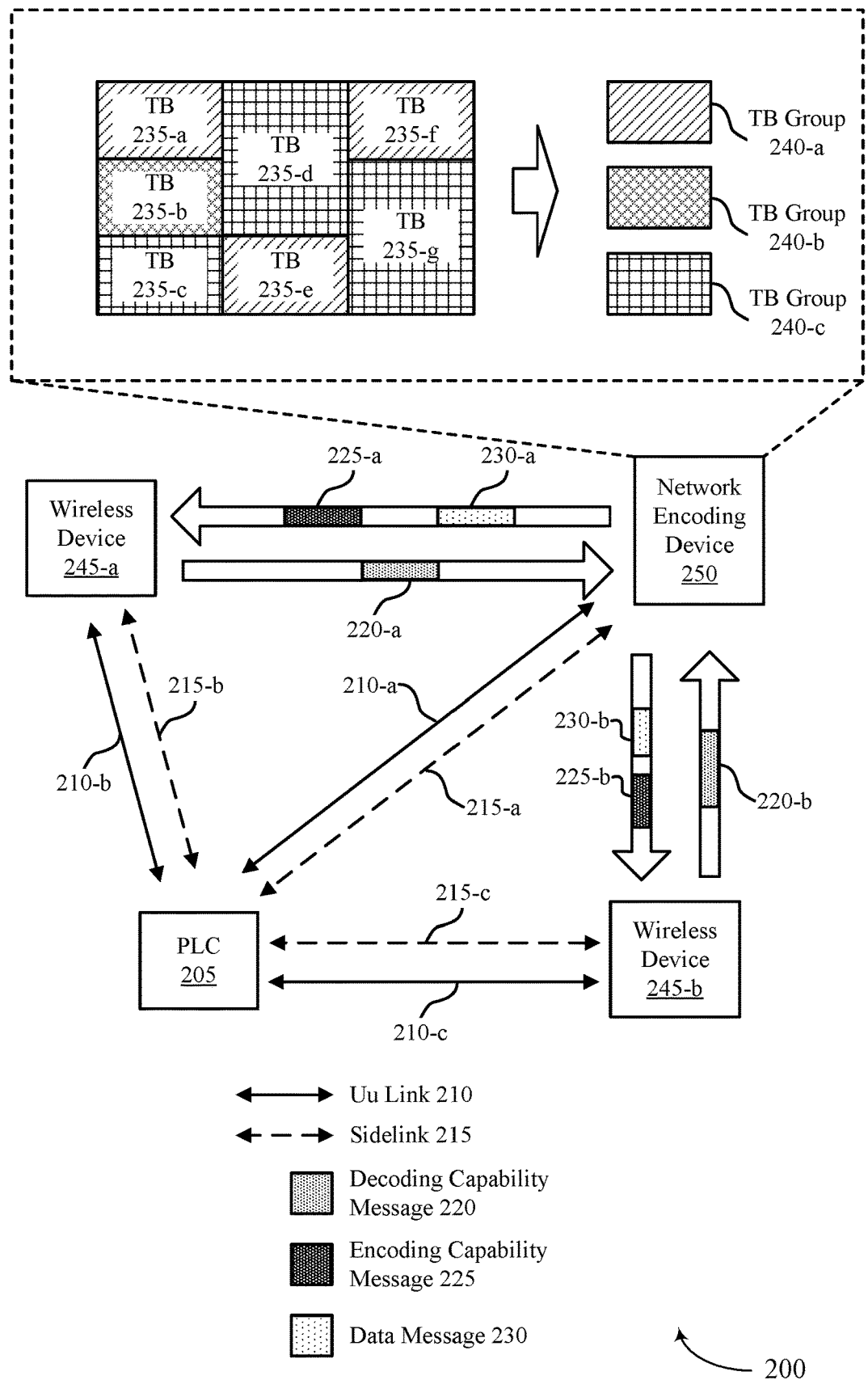
FIG. 2 illustrates an example of a wireless communications system that supports signaling for enabling erasure coding in accordance with one or more aspects of the present disclosure.

FIG. 2 illustrates an example of a wireless communications system 200 that supports signaling for enabling erasure coding in accordance with one or more aspects of the present disclosure. In some examples, the wireless communications system 200 may support aspects of a wireless communications system 100. For example, the wireless communications system 200 may include a network encoding device 250 which may be an example of a UE 115 or a network entity 105 with reference to FIG. 1. Additionally, the wireless communications system 200 may include wireless device 245-a and wireless device 245-b. In some examples, a wireless device 245 may be an example of a UE 115 or a network entity 105, with reference to FIG. 1. Further, wireless communications system 200 may include a programmable logic controller (PLC) 205, which may serve as a relay device between the wireless devices 245 and the network encoding device 250.

In some cases, the PLC 205 may be an example of a UE 115 and may communicate with the wireless device 245-a, the wireless device 245-b, and the network encoding device 250 via a UE-UE PC5 sidelink 215 (e.g., sidelink 215-a, 215-b, and 215-c). Additionally, or alternatively, the PLC 205 may be an example of a 5G-NR femtocell (e.g., associated with or coupled with a network entity 105) and communicate with the wireless device 245-a, the wireless device 245-b, and the network encoding device 250 via Uu link 210 (e.g., Uu link 210-a, 210-b, and 210-c).

In some examples, the network encoding device 250 may transmit one or more blocks of data (e.g., TBs 235) to the wireless device 245-a and the wireless device 245-b. In some cases, a TB 235 may include multiple code blocks, where if a wireless device 245 receives one code block of the TB 235 with error, the wireless device 245 may report a non-acknowledgement (NACK) message to the network encoding device 250. As such, the network encoding device 250 may retransmit the TB 235. Additionally, or alternatively, if a TB 235 includes multiple code blocks, the code blocks may be grouped in one or more code block groups (CBGs). As such, a wireless device 245 may receive the CBGs and transmit an acknowledgment (ACK) message or a NACK message for each of CBG of the TB 235. In some examples, transmitting a response message for each CBG may increase the HARQ efficiency associated with communications between the network encoding device 250 and the wireless devices 245.

In some cases, the wireless communications system 200 may be configured with one or more block error rate (BLER) parameters for traffic. For example, the wireless devices 245 and the network encoding device 250 may target for transmissions (e.g., via a physical downlink shared channel (PDSCH) or a physical uplink shared channel (PUSCH)) to have an associated BLER under a configured threshold. For instance, if the wireless communications system 200 is associated with a BLER of 10%, then on average one code block out of 10 code blocks may have a transmission error. In examples where a code block has an associated error above a target BLER, a wireless device 245 may transmit a NACK message in response to the associated TB 235, and the network encoding device 250 may retransmit the TB 235.

In some examples, the network devices of wireless communications system 200 may operate in accordance with one or more network coding techniques to reduce the number of TB 235 retransmissions. For example, the network encoding device 250 may perform network encoding to generate a wireless transmission that is a function of multiple TBs 235. For example, as illustrated in FIG. 2, the network encoding device 250 may combine TB 235-a, TB 235-e, and 235-f into a TB group 240-a for transmission.

In some examples, the process of extracting contents of the respective TBs 235 in TB group 240-a may be based on erasure coding techniques. For example, a single erasure code technique may generate one missing TB 235 from the set of TBs 235 in a transmission. For instance, if a first input describes a vector [a, b, c] where a, b, and c each respectively describe TB 235-a, TB 235-e, and 235-f, then the network encoding device 250 may perform network encoding to generate a second vector [a, b, c, a⊕b⊕], where a⊕b⊕c is a combination of a, b, and c. As such, if a wireless device 245 receives the encoded second vector as [a, ?, c, a⊕b⊕c], where the element b is not received, the UE 115 may use Equation 1 to determine element b:

$$b = a \oplus c \oplus (a \oplus b \oplus c) \quad (1)$$

The example shown in Equation 1 may be generalized as a linear system over a Galois field with three variables and four linearly independent constraints as shown in Equation 2:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T \quad (2)$$

As such, three constraints (e.g., one erasure) may be sufficient to find the contents of the variables a, b, and c.

While the erasure coding example described herein may be with reference to three variables, it is noted that wireless communications system 200 may use the techniques of erasure coding for any number of variables. For example, the network encoding device 250 may use a multi-erasure code technique which may generate two or more missing TBs 235 from a set of TBs 235 in a transmission. For instance, if a first input describes a vector [a, b, c] where a, b, and c each respectively describe TB 235-a, TB 235-e, and 235-f, then the network encoding device 250 may perform network encoding to generate a second vector [a, b, c, a+b+c, a+a·b+a²·c] where a is a scalar coefficient. The example for multi-erasure code may be generalized as a Reed-Solomon coding technique as shown in Equation 3:

$$\begin{bmatrix} 1 & 0 & 0 \\ 0 & 1 & 0 \\ 0 & 0 & 1 \\ 1 & 1 & 1 \\ 1 & \alpha & \alpha^2 \end{bmatrix} \cdot [a \ b \ c]^T = [a \ b \ c \ a+b+c \ b+a^2 \cdot c]^T \quad (3)$$

While Equation 3 is an example of a coding procedure which may recover up to two TBs 235, it is understood, that the methods illustrated in Equation 3 may be generalized to solve for any quantity of TBs 235.

As such, network coding may be used to increase system capacity and improve resource utilization for wireless communications system 200. Network coding may also reduce a quantity of retransmissions based on the wireless devices 245 using network coding to generate missing TBs 235. As such, network coding techniques may enable the wireless communications system 200 to support an increased quantity of wireless devices 245, an increased quantity of traffic from each wireless device 245, or both.

In some examples, the network encoding device 250 may be configured to perform multiple different types of erasure encoding or use multiple different approaches for erasure encoding. For example, in a first erasure encoding type the network encoding device 250 may group the TBs 235 into TB groups 240 (e.g., TB 235-a, TB 235-e, and TB 235-f in TB group 240-a, TB 235-b in TB group 240-b, and TB 235-c, TB 235-d, and TB 235-g in TB group 240-c). The network encoding device 250 may encode the TBs 235 within each TB group 240 using an erasure coding technique (e.g., the single erasure code technique or the multi-erasure code technique). Based on performing the encoding using an erasure coding technique, the network encoding device 250 may encode using an LDPC, and transmit the network encoded message.

In a second erasure encoding type, the network encoding device 250 may group the TBs 235 into TB groups 240 (e.g., TB 235-a, TB 235-e, and TB 235-f in TB group 240-a. TB 235-*b* in TB group 240-*b*, and TB 235-*c*, TB 235-*d*, and TB 235-*g* in TB group 240-*c*). The network encoding device 250 may encode the TBs 235 within each TB group 240 using LDPC (e.g., prior to performing erasure coding). Based on performing the LDPC, the network entity may encode using an erasure coding technique (e.g., the single erasure code technique or the multi-erasure code technique), and the transmit the network encoded message. In some examples of the second encoding approach, the TBs 235 of a given TB group 240 may be rate-matched to a same quantity of coded bits.

In some examples, reliability may change based on a decoding order of TBs 235 at the wireless devices 245. Additionally, or alternatively, parameters used at the network encoding device 250 to encode the TBs 235 may change the reliability of network encoded transmissions. For example, with reference to Reed-Solomon (or other multi-dimensional scaling (MDS) coding techniques), a value of the scalar coefficient α may change the reliability of decoding TBs 235 at the wireless devices 245. Additionally, or alternatively, the reliability of a given erasure encoding type may be based on the signal to interference and noise ratio (SINR) for a transmission channel. For example, the first erasure encoding type may have a higher reliability relative to the second erasure encoding type at a first SINR value, and the second erasure encoding type may have a higher reliability relative to the first erasure encoding type at a second SINR value. Additionally, or alternatively, the wireless devices 245 may not be configured to decode network encoded messages with one or more of the erasure encoding types or one or more of the erasure encoding techniques.

According to the techniques described herein, the network encoding device 250 and the wireless devices 245 receiving encoded data may communicate one or more capability messages to identify an erasure encoding technique to use (e.g., the single erasure code technique or the multi-erasure code technique), which of the erasure encoding types to use (e.g., the first or second erasure encoding type), and one or more parameters associated with the erasure encoding technique and the erasure encoding type being used.

In some examples, the wireless devices 245 may each transmit, a respective decoding capability message 220 (e.g., decoding capability message 220-*a* and 220-*b*) indicating one or more erasure encoding types supported at the respective wireless devices 245 (e.g., the first erasure encoding type, the second erasure encoding type, or both). Additionally, or alternatively, the decoding capability message 220 may indicate different types erasure encoding techniques supported at the respective wireless devices 245 (e.g., the single erasure code technique, the multi-erasure code technique, or both).

Additionally, or alternatively, the network encoding device 250 may transmit an encoding capability message 225 to the wireless device 245-*a* and the wireless device 245-*b* (e.g., an encoding capability message 225-*a* and 225-*b* respectively). In some examples, the encoding capability message 225 may indicate one or more parameters associated with an erasure encoding technique and the selected erasure encoding type. For example, if the network encoding device 250 selects the second erasure encoding type, the one or more parameters may indicate which combining coefficients are used during network coding (e.g., the scalar coefficient α for use in the Reed-Solomon coding technique).

In some examples, the network encoding device 250 may select which erasure encoding technique, which erasure encoding type, and which parameters to transmit in the encoding capability message 225 based on receiving the respective decoding capability messages 220 from the wireless device 245-*a* and the wireless device 245-*b*. For example, if the wireless device 245-*a* indicates, in decoding capability message 220-*a*, support to decode in accordance with the first erasure encoding type but no support to decode in accordance with the second erasure encoding type, then the network encoding device 250 may indicate the first erasure encoding type in encoding capability message 225-*a*.

Additionally, or alternatively, the network encoding device 250 may determine the erasure encoding type and the type of parameters to include in the encoding capability message 225 based on the SINR of a channel or one or more other channel parameters. For example, if a channel for transmission with the wireless device 245-*a* is associated with a first SINR value, the network encoding device 250 may indicate the first erasure encoding type in the encoding capability message 225-*a*. If the channel for transmission with the wireless device 245-*a* is associated with a second SINR value different from the first SINR value, the network encoding device 250 may indicate the second erasure encoding type in the encoding capability message 225-*a*.

In examples of sidelink communications, the network encoding device 250 may configure one or more resource pools for wireless transmissions. In some examples, the encoding capability message 225 may indicate a respective erasure encoding types for each of the one or more configured resource pools. In sidelink, if both erasure encoding types are supported, then the network encoding device 250 may enable one of the erasure encoding types via signaling. For example, if the network encoding device 250 is a network entity 105, the network encoding device 250 may enable the erasure encoding type for a given resource pool via L1, L2, or L3 signaling (e.g., in a Mode 1 manner). Additionally, or alternatively, if the network encoding device 250 is an example of a UE 115 and the wireless device 245-*a* is an example of a UE 115, the network encoding device 250 may enable the erasure encoding type for a given resource pool during RRC configuration. In some examples, the respective erasure encoding type for the one or more resource pools may be the same erasure encoding type or different erasure encoding types. If both erasure encoding types are supported for a given resource pool, then the network encoding device 250 and the wireless device 245-*a* may select an erasure encoding type to use based on the respective capabilities of the network encoding device 250 and the wireless device 245-*a*.

In examples of Uu communications, the network encoding device 250 may configure one or more sub-band frequencies for wireless communications. As such, the encoding capability message 225 may indicate a respective erasure encoding type for each of the one or more configured sub-band frequencies. Additionally, or alternatively, the network encoding device 250 may transmit a respective encoding capability message 225 via each sub-band frequency, where the respective encoding capability message 225 indicates one or more parameters associated with an erasure encoding technique and an erasure encoding type for the associated sub-band frequency.

Based on transmitting the encoding capability message 225, the network encoding device 250 may encode data in accordance with the erasure encoding type indicated in the encoding capability message. As such, the network encoding device 250 may transmit data messages 230 to the wireless devices 245. For example, the network encoding device 250 may transmit a data message 230-*a* to wireless device 245-*a* in accordance with the encoding capability message 225-*a* and transmit a data message 230-*b* to wireless device 245-*b* in accordance with the encoding capability message 225-*b*.

In some examples, the wireless devices 245 may decode the data messages 230 in accordance with the one or more parameters and the erasure encoding type indicated in the encoding capability message 225. In some examples, the TBs 235 may be associated with a level of data priority (e.g., a first TB 235 may have a high data priority relative to second TB 235). Additionally, or alternatively, the first erasure encoding type and the second erasure encoding type may be associated with different types of parameters. As such, the network encoding device 250 may indicate one or more parameters to the wireless devices 245 associated with decoding the data messages 230.

In some examples, the one or more parameters may indicate a suggested decoding order for the data message 230. For instance, the network encoding device 250 may indicate to the wireless device 245-*a* to decode the TBs 235 of data message 230-*a* using a first ordering. As such, the wireless device 245-*a* may decode the TBs 235 of data message 230-*a* in accordance with the first ordering, where the first ordering may be associated with a priority of the TBs 235.

Additionally, or alternatively, the one or more parameters may indicate the erasure encoding technique used to encode the data message 230. For instance, the network encoding device 250 may indicate to the wireless device 245-*a*, via the one or more parameters, that the data message 230-*a* is encoded using a single erasure encoding technique or a multi-erasure encoding technique. As such, the wireless device 245-*a* may decode the data message 230-*a* in accordance with the erasure encoding technique indicated by the one or more parameters.

Additionally, or alternatively, if the network encoding device 250 uses the second erasure encoding type to encode the data message 225, then the one or more parameters may indicate one or more coefficients associated with the second erasure encoding type. For example, the one or more parameters may indicate a combining coefficient (e.g., a) associated with the second erasure encoding type. The one or more parameters may also indicate power control information associated with the second erasure encoding type. As such, the wireless device 245-*a* may receive the one or more parameters and decode the data message 230-*a* using the one or more coefficients the power control information, or both.

In some cases, the network encoding device 250 may transmit an indication of the one or more parameters using a control channel. For example, if the network encoding device 250 is an example of network entity 105, then the network encoding device 250 may transmit the one or more parameters as via downlink control information (DCI). If the network encoding device 250 is an example of a UE 115 communicating via a Uu link 210, then the network encoding device 250 may transmit the one or more parameters via uplink control information (UCI) or configured grant UCI (CG-UCI). If the network encoding device 250 is an example of a UE 115 communicating via a sidelink 215, then the network encoding device 250 may transmit the one or more parameters via sidelink control information (SCI). In some examples, the indication of the one or more parameters may be included in the encoding capability message 225 or in separate control signaling. In some examples, the indication of the one or more parameters may be carrier via a MAC message, such as a MAC control element (MAC-CE) (e.g., L2 signaling), or via RRC signaling (e.g., L3 signaling).

In some examples, the one or more parameters may be configured at the network encoding device 250 via L1, L2, and L3. For example, the network encoding device 250 may select the one or more parameters via L2 or L3, down select the one or more parameters in L3 and L2 to L2, and configure the one or more parameters into a single set of parameters in L1.

In examples of sidelink communications, the one or more parameters may be the same across the one or more configured resource pools or different across the one or more configured resource pools. If the network encoding device 250 is an example of a UE 115, then an associated network entity 105 may select the one or more parameters via L1, L2, and L3 signaling based on communicating with the network encoding device 250, and transmit the one or more parameters to the network encoding device 250. Additionally, or alternatively, based on the one or more parameters configured for a resource pool, the network encoding device 250 and the wireless devices 245 may agree to use the one or more parameters of the given resource pool. In examples where the network coding device 250 is a UE 115 and the wireless device 245-*a* is a UE 115, the network coding device 250 and the wireless device 245-*a* may agree on the one or more parameters during initial sidelink configuration or in future sidelink communications using L1, L2, or L3 signaling.

In some examples, the PLC 205 (or a primary UE 115) may configure the wireless devices 245 and the network encoding device 250 for sidelink. Additionally, or alternatively, the PLC 205 may be an example of a helper transmitter. As such, the PLC 205 may receive TBs 235 from a set of wireless devices 245 or network encoding devices 250 and perform erasure channel encoding across the TBs 235 from the devices and transmit to the same or different wireless devices 245. Based on the PLC 205 communicating with multiple network encoding devices 250 and multiple wireless devices 245, the PLC 205 may communicate vie group common control signals.

Figure 3:
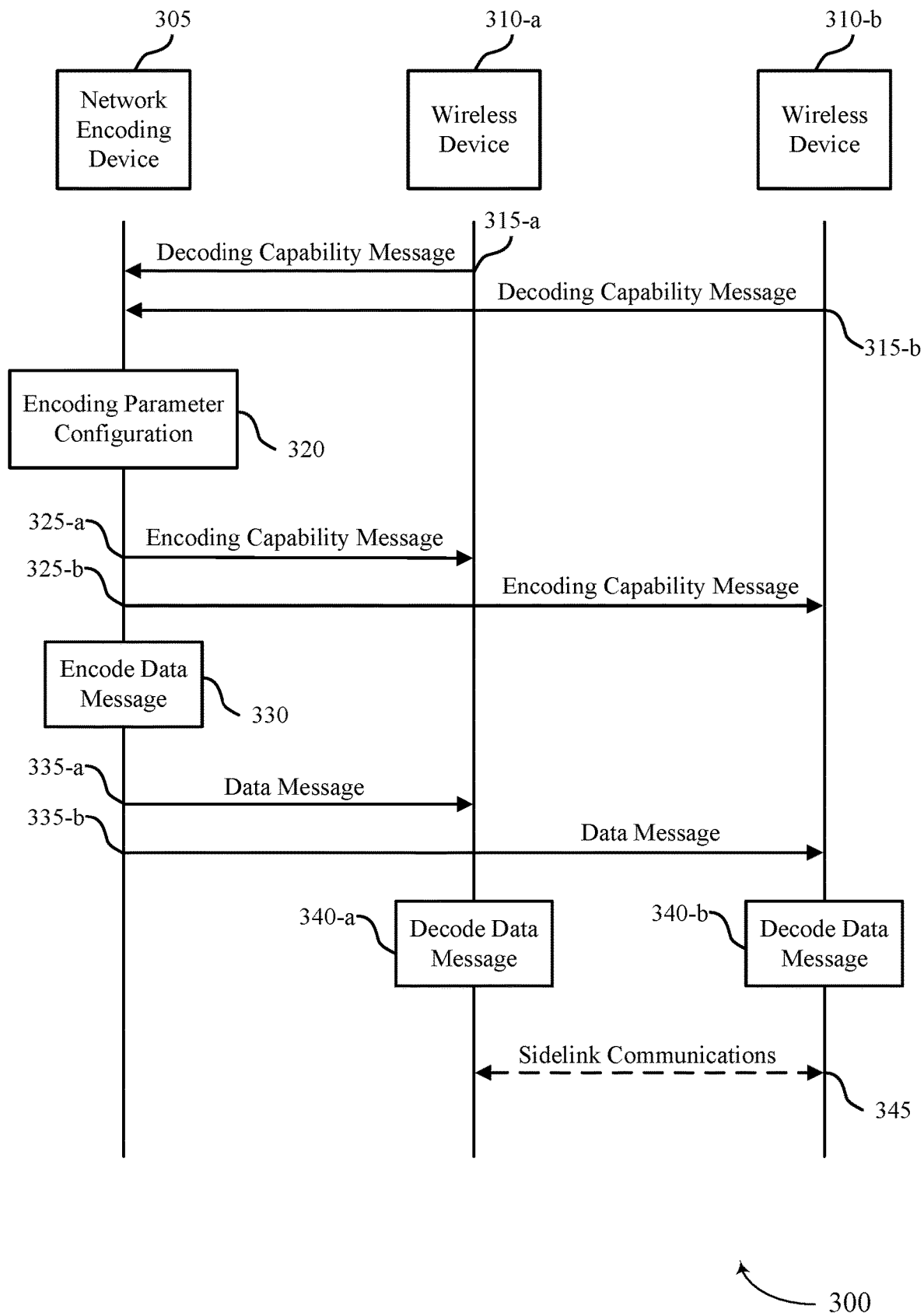
FIG. 3 illustrates an example of a process flow that supports signaling for enabling erasure coding in accordance with one or more aspects of the present disclosure.

FIG. 3 illustrates an example of a process flow 300 that supports signaling for enabling erasure coding in accordance with one or more aspects of the present disclosure. In some examples, the process flow 300 may be implemented by aspects of a wireless communications system 100 and wireless communications system 200. For example, the process flow 300 may be implemented by a wireless device 310-*a* and a wireless device 310-*b* which may be respective examples of a wireless device 245, with reference to FIG. 2. Additionally, the network encoding device 305 may be an example of a network encoding device 250, with reference to FIG. 2. In some examples, the wireless devices 310 may be examples of UEs 115 and network entities 105 with reference to FIG. 1. In some examples, the network encoding device 305 may be an example of a UE 115 or a network entity with reference to FIG. 1. Alternative examples of the following may be implemented, where some steps are performed in a different order than described or are not performed at all. In some cases, steps may include additional features not mentioned below, or further steps may be added.

At 315, the wireless devices 310 may transmit respective decoding capability messages. For example, at 315-*a*, the wireless device 310-*a* may transmit a first decoding capability message and at 315-*b*, the wireless device 310-*b* may transmit a second decoding capability message. In some examples, a given decoding capability message may indicate a set of one or more erasure encoding types from a set of erasure encoding types supported by the given wireless device 310. Additionally, or alternatively the given decoding capability message may further include an indication of a power reception capability of the given wireless device 310. The network encoding device 305 may receive respective decoding capability messages from the wireless device 310-*a* and the wireless device 310-*b*.

At 320, the network encoding device 305 may select parameters for an encoding parameter configuration. For example, the network encoding device 305 may select one or more parameters associated with an erasure encoding and an erasure encoding type. In some examples, the network coding device 305 may select, via L3 or L2, the one or more parameters, down select the one or more parameters from L3 or L2 to L2, and configure, via L1, the one or more parameters into a single set of parameters in L1.

At 325, the network encoding device 305 may transmit an encoding capability message indicating the one or more parameters selected at 320, where the one or more parameters associated with erasure encoding and an erasure encoding type from a set of defined erasure encoding types. In some examples, the erasure encoding type is associated with an order between the erasure encoding and a LDPC encoding. At 325-*a* the network encoding device 305 may transmit an encoding capability message to the network device 310-*a* and at 325-*b* the network encoding device 305 may transmit an encoding capability message to the wireless device 310-*b*. In some examples, the network encoding capability message at 325-*a* and 325-*b* may be the same encoding capability message or different encoding capability messages.

In some examples, the network encoding device 305 may transmit the encoding capability messages based on receiving the respective decoding capability messages at 315. For example, the decoding capability message form the wireless device 310-*a* may indicate support to decode data in accordance with a first erasure encoding type from the set of defined erasure encoding types and a second erasure encoding type from the set of defined erasure encoding types, and the decoding capability message form the wireless device 310-*b* may indicate support to decode data in accordance with the first erasure encoding type. As such, the erasure encoding type indicated in the encoding capability message may be the first erasure encoding type based on the wireless device 310-*a* and the wireless device 310-*b* indicating capability to decode data in accordance with the first erasure encoding type.

In some examples, the encoding capability message may include an indication that one or more resource pools may be associated with respective erasure encoding types from the set of defined erasure encoding types and respective sets of sidelink parameters. In some examples, the one or more resource pools are used for sidelink between the wireless device 310-*a* and the wireless device 310-*b*, the network encoding device 305 and the wireless device 310-*a*, the network encoding device 305 and the wireless device 310-*b*, or a combination thereof. In some examples, the respective erasure encoding types may be a same respective erasure encoding type or different respective erasure encoding types, and the respective sets of sidelink parameters may be a same set of sidelink parameters or different sets of sidelink parameters.

In some examples, the encoding capability message may include an indication that one or more frequency sub-bands are associated with respective erasure encoding types from the set of defined erasure encoding types. In some examples, the one or more frequency sub-bands are used for communications between the given wireless device 310 and the network encoding device 305.

In some examples, the one or more parameters may indicate a decoding order for the data. For example, the decoding order may be based on a data priority for code blocks or CBGs of the data and the erasure encoding type. Additionally, or alternatively, the one or more parameters indicate the erasure encoding type. Additionally, or alternatively, the one or more parameters indicate one or more coefficients associated with a second erasure encoding type from the set of defined erasure encoding types, power control information associated with the second erasure encoding type, or both.

In some examples, the erasure encoding type and the one or more parameters may be based on an SINR for a channel established between a given wireless device 310 and network coding device 305, one or more characteristics of the channel, or both. In some examples, the network encoding device 305 may transmit the encoding capability message via a control information message (e.g., via L1), a MAC message (e.g., via L2), an RRC message (e.g., via L3), or a combination thereof.

At 330, the network encoding device 305 may encode data in accordance with the one or more parameters and the erasure encoding type indicated in the encoding capability message. If the erasure encoding type is the first erasure encoding type, then the network encoding device 305 may perform the erasure encoding prior to a LDPC encoding in accordance with the first erasure encoding type. If the erasure encoding type is the second erasure encoding type, then the network encoding device 305 may perform a LDPC encoding prior to the erasure encoding in accordance with the second erasure encoding type.

At 335, the network encoding device 305 may transmit a data message including the data encoded in accordance with the encoding capability message. For example, at 335-*a* wireless device 310-*a* may receive a first data message and at 335-*b*, the wireless device 310-*b* may receive a second data message. In some examples, the first and second data messages may be a same data message or different data messages.

At 340, the wireless devices 310 may decode the data of the data messages in accordance with the one or more parameters and the erasure encoding type indicated in the encoding capability message. For example, at 340-*a*, the wireless device 310-*a* may decode the first data message and at 340-*b*, the wireless device 310-*b* may decode the second data message. In some examples, decoding the data may be based on the erasure encoding type. In some examples, the decoding order may be based on the data priority for code blocks or CBGs of the data and the erasure encoding type.

If the data is associated with the first erasure encoding type, then the wireless devices 310 may perform an erasure decoding prior to a LDPC decoding in accordance with the first erasure encoding type. If the data is associated with the second erasure encoding type, then the wireless devices 310 may perform performing a LDPC decoding prior to an erasure decoding in accordance with the second erasure encoding type. Additionally, or alternatively, if the erasure coding type is of the second erasure coding type, decoding the data may be based on the one or more coefficients associated with the second erasure coding type, the power control information associated with the second erasure coding type, or both.

At 345, the wireless devices 310 may communicate in accordance with sidelink. For example, the wireless device 310-*a* and the wireless device 310-*b* may communicate via a first resource of the one or more resource pools using a set of sidelink parameters associated with the first resource pool.

In some examples, the network encoding device 305 may be an example of a relay device that may be connected to one or more other network encoding devices 305 and one or more wireless devices 310. As such the network encoding device 305 may receive from one or more first wireless devices 310 respective blocks that include the set of blocks included in the data. In such examples, the encoding of the data at 330 may be based on receiving the respective blocks from the one or more first wireless devices 310. Additionally, or alternatively, at 335, the network encoding device 305 may transmit to one or more second wireless devices 310, the data message including the data based on receiving the respective blocks from the one or more first wireless devices 310. In some examples, the one or more first wireless devices 310 may be the same as or different from the one or more second wireless devices 310.

Figure 4:
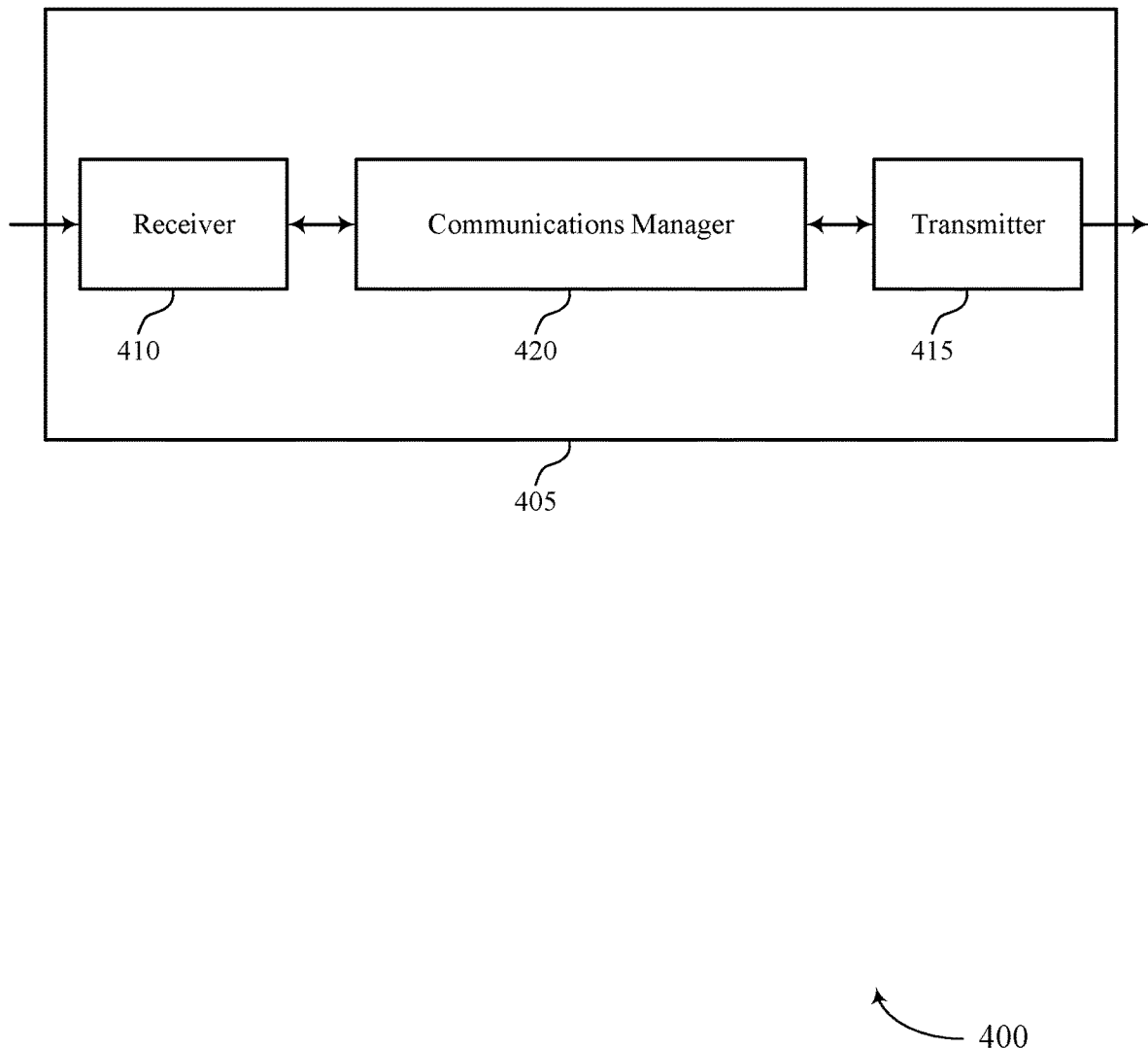
FIGS. 4 and 5 illustrate block diagrams of devices that support signaling for enabling erasure coding in accordance with one or more aspects of the present disclosure.

FIG. 4 illustrates a block diagram 400 of a device 405 that supports signaling for enabling erasure coding in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to signaling for enabling erasure coding). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to signaling for enabling erasure coding). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of signaling for enabling erasure coding as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a wireless device in accordance with examples as disclosed herein. For example, the communications manager 420 may be configured as or otherwise support a means for receiving, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding. The communications manager 420 may be configured as or otherwise support a means for receiving, from the network encoding device, a data message including data encoded in accordance with the encoding capability message. The communications manager 420 may be configured as or otherwise support a means for decoding the data of the data message in accordance with the one or more parameters and the erasure encoding type indicated in the encoding capability message.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for network encoding which may result in reduced processing, reduced power consumption, and more efficient utilization of communication resources.

Figure 5:
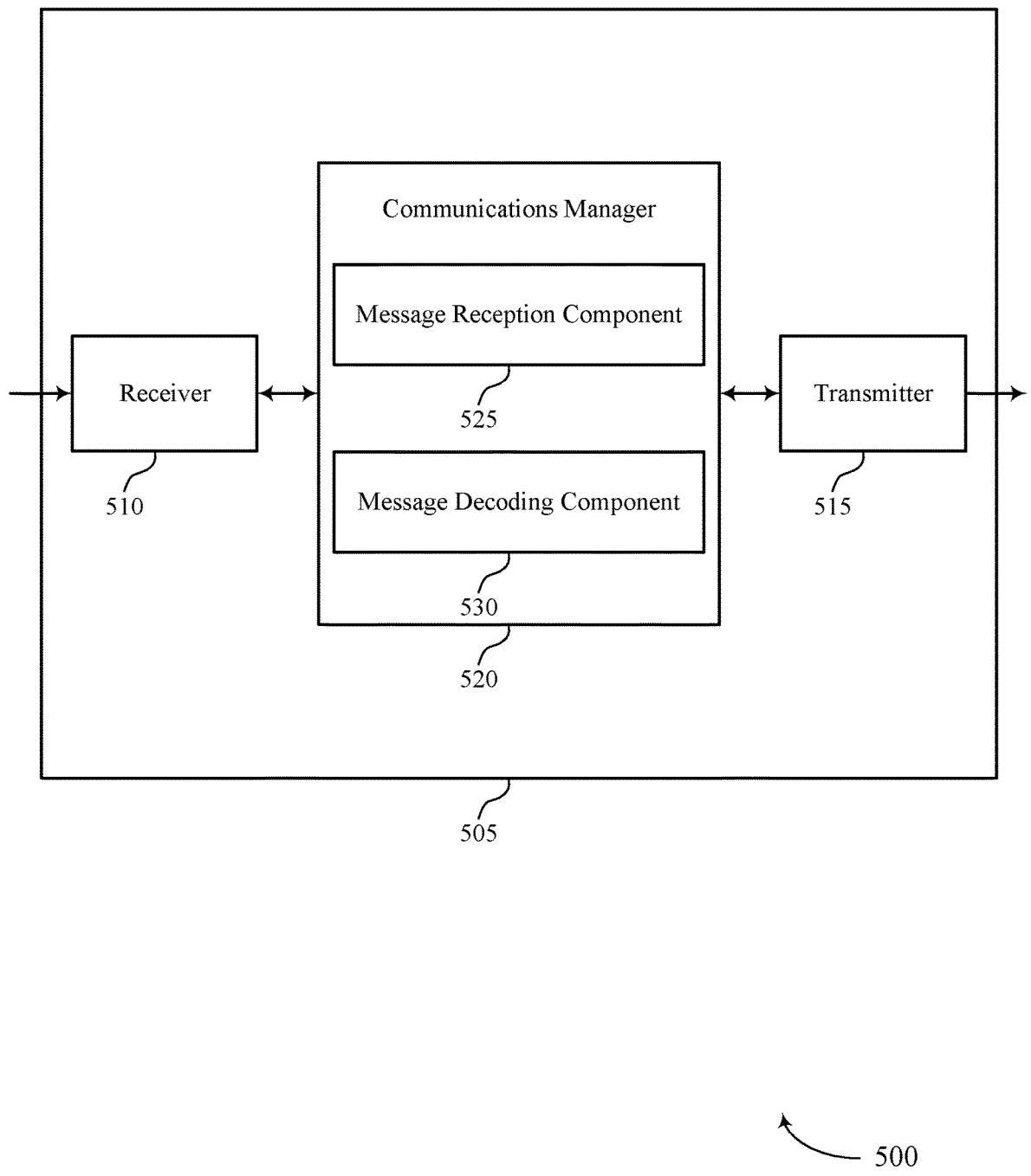

FIG. 5 illustrates a block diagram 500 of a device 505 that supports signaling for enabling erasure coding in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to signaling for enabling erasure coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signaling for enabling erasure coding). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of signaling for enabling erasure coding as described herein. For example, the communications manager 520 may include a message reception component 525 a message decoding component 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a wireless device in accordance with examples as disclosed herein. The message reception component 525 may be configured as or otherwise support a means for receiving, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding. The message reception component 525 may be configured as or otherwise support a means for receiving, from the network encoding device, a data message including data encoded in accordance with the encoding capability message. The message decoding component 530 may be configured as or otherwise support a means for decoding the data of the data message in accordance with the one or more parameters and the erasure encoding type indicated in the encoding capability message.

Figure 6:
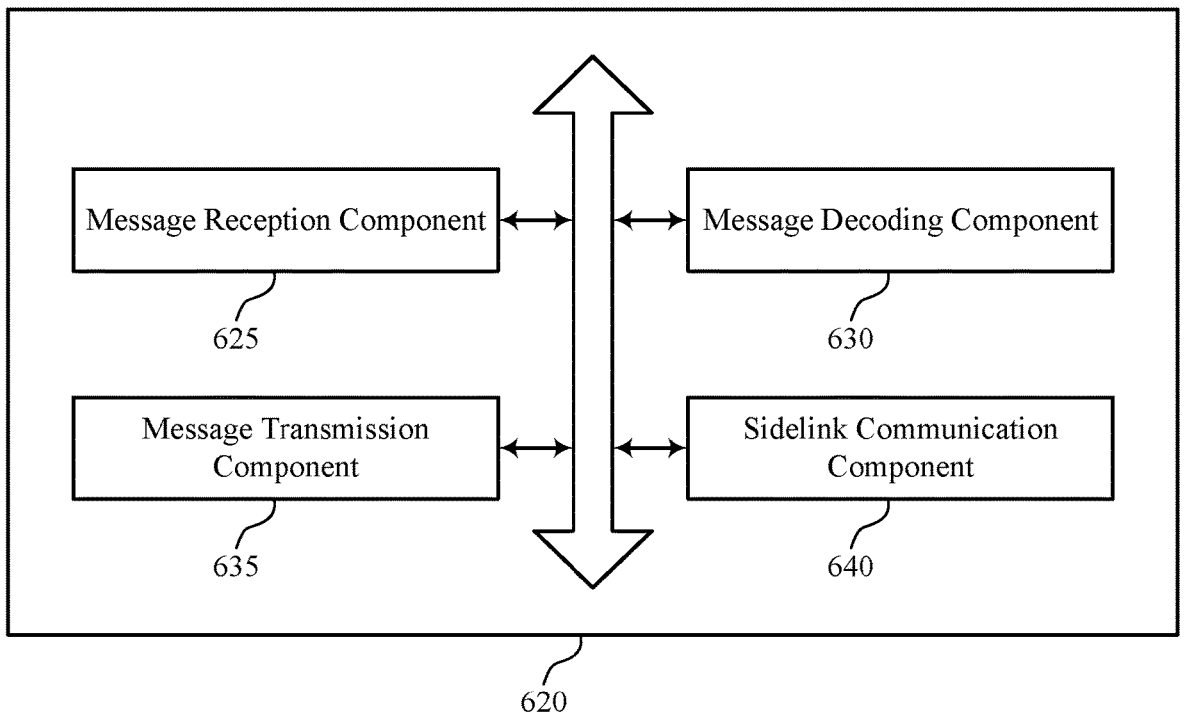
FIG. 6 illustrates a block diagram of a communications manager that supports signaling for enabling erasure coding in accordance with one or more aspects of the present disclosure.

FIG. 6 illustrates a block diagram 600 of a communications manager 620 that supports signaling for enabling erasure coding in accordance with one or more aspects of the present disclosure. The communications manager 620 may be an example of aspects of a communications manager 420, a communications manager 520, or both, as described herein. The communications manager 620, or various components thereof, may be an example of means for performing various aspects of signaling for enabling erasure coding as described herein. For example, the communications manager 620 may include a message reception component 625, a message decoding component 630, a message transmission component 635, a sidelink communication component 640, or any combination thereof. Each of these components may communicate, directly or indirectly, with one another (e.g., via one or more buses).

The communications manager 620 may support wireless communications at a wireless device in accordance with examples as disclosed herein. The message reception component 625 may be configured as or otherwise support a means for receiving, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding. In some examples, the message reception component 625 may be configured as or otherwise support a means for receiving, from the network encoding device, a data message including data encoded in accordance with the encoding capability message. The message decoding component 630 may be configured as or otherwise support a means for decoding the data of the data message in accordance with the one or more parameters and the erasure encoding type indicated in the encoding capability message.

In some examples, the erasure encoding type is a first erasure encoding type from the set of multiple defined erasure encoding types and, to support decoding the data of the data message, the message decoding component 630 may be configured as or otherwise support a means for performing an erasure decoding prior to a LDPC decoding in accordance with the first erasure encoding type.

In some examples, the erasure encoding type is a second erasure encoding type from the set of multiple defined erasure encoding types and, to support decoding the data of the data message, the message decoding component 630 may be configured as or otherwise support a means for performing a LDPC decoding prior to an erasure decoding in accordance with the second erasure encoding type.

In some examples, the message transmission component 635 may be configured as or otherwise support a means for transmitting, to the network encoding device, a decoding capability message indicating a set of one or more erasure encoding types from a set of multiple erasure encoding types supported by the wireless device for decoding, where receiving the encoding capability message is based on transmitting the decoding capability message.

In some examples, the decoding capability message further includes an indication of a power reception capability of the wireless device.

In some examples, to support receiving the encoding capability message, the message reception component 625 may be configured as or otherwise support a means for receiving an indication that one or more resource pools are associated with respective erasure encoding types from the set of multiple defined erasure encoding types and respective sets of sidelink parameters, where the one or more resource pools are used for sidelink between the wireless device and a second wireless device or the network encoding device.

In some examples, the sidelink communication component 640 may be configured as or otherwise support a means for communicating, with the second wireless device via a first resource pool of the one or more resource pools, using a set of sidelink parameters associated with the first resource pool.

In some examples, the respective erasure encoding types are a same respective erasure encoding type or different respective erasure encoding types, and the respective sets of sidelink parameters are a same set of sidelink parameters or different sets of sidelink parameters.

In some examples, to support receiving the encoding capability message, the message reception component 625 may be configured as or otherwise support a means for receiving an indication that one or more frequency sub-bands are associated with respective erasure encoding types from the set of multiple defined erasure encoding types, where the one or more frequency sub-bands are used for communications between the wireless device and the network encoding device.

In some examples, the one or more parameters indicate a decoding order for the data. In some examples, the decoding order is based on data priority for code blocks or CBGs of the data and the erasure encoding type.

In some examples, the one or more parameters indicate the erasure encoding type. In some examples, decoding the data is based on the erasure encoding type.

In some examples, the one or more parameters indicate one or more coefficients associated with a second erasure encoding type from the set of multiple defined erasure encoding types, power control information associated with the second erasure encoding type, or both. In some examples, decoding the data is based on the one or more coefficients, the power control information, or both.

In some examples, the erasure encoding type and the one or more parameters are based on a signal to interference and noise ratio for a channel established between the wireless device and network coding device, one or more characteristics of the channel, or both.

In some examples, the message reception component 625 may be configured as or otherwise support a means for receiving the encoding capability message via a control information message, a MAC message, a RRC message, or a combination thereof.

In some examples, the wireless device includes a UE or a network entity, and the network encoding device includes a UE or a network entity.

Figure 7:
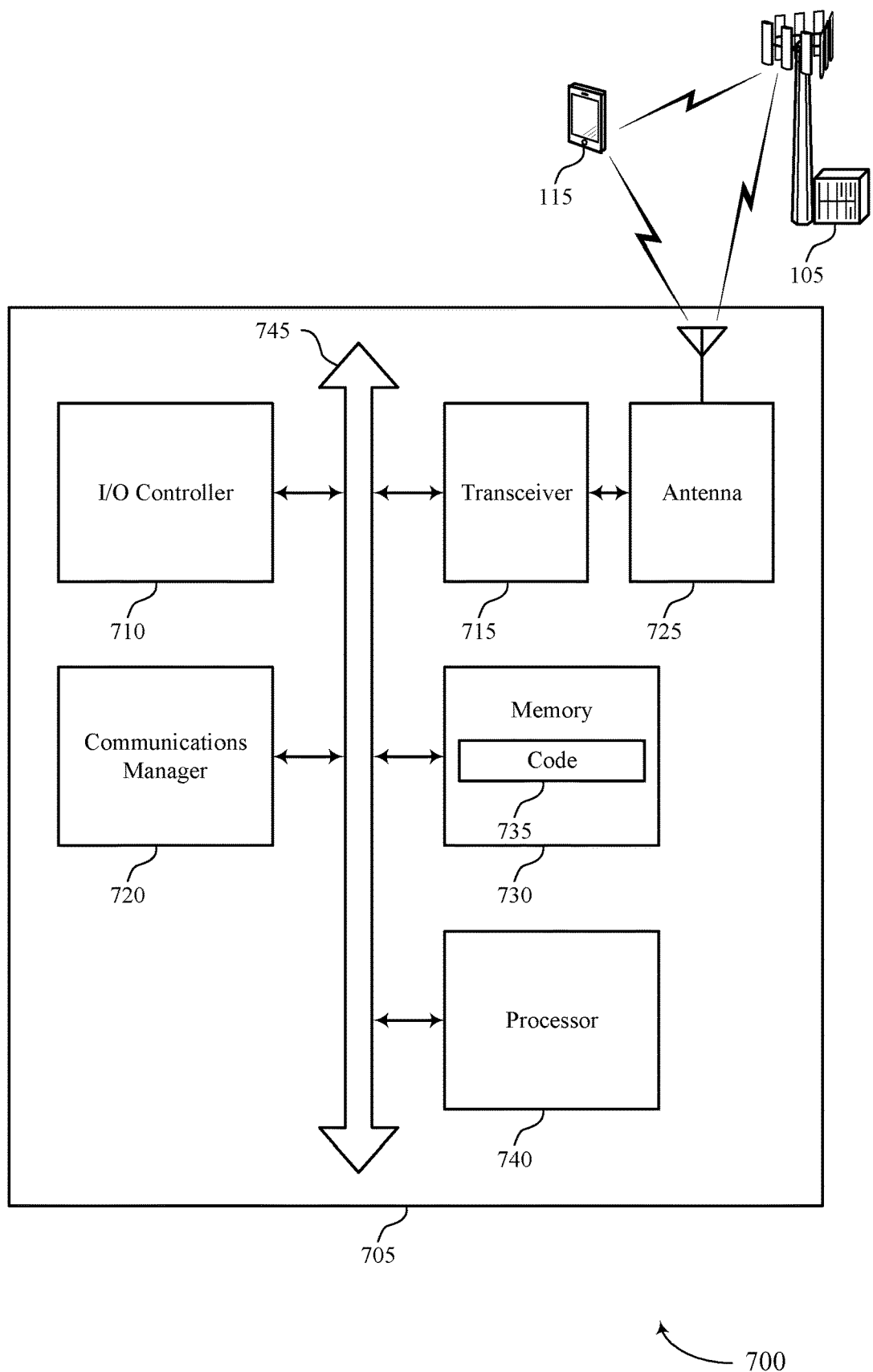
FIG. 7 illustrates a diagram of a system including a device that supports signaling for enabling erasure coding in accordance with one or more aspects of the present disclosure.

FIG. 7 illustrates a diagram of a system 700 including a device 705 that supports signaling for enabling erasure coding in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting signaling for enabling erasure coding). For example, the device 705 or a component of the device 705 may include a processor 740 and memory 730 coupled with or to the processor 740, the processor 740 and memory 730 configured to perform various functions described herein.

The communications manager 720 may support wireless communications at a wireless device in accordance with examples as disclosed herein. For example, the communications manager 720 may be configured as or otherwise support a means for receiving, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding. The communications manager 720 may be configured as or otherwise support a means for receiving, from the network encoding device, a data message including data encoded in accordance with the encoding capability message. The communications manager 720 may be configured as or otherwise support a means for decoding the data of the data message in accordance with the one or more parameters and the erasure encoding type indicated in the encoding capability message.

By including or configuring the communications manager 720 in accordance with examples as described herein, the device 705 may support techniques for network encoding which may result in improved communication reliability, reduced latency, improved user experience related to reduced processing, reduced power consumption, more efficient utilization of communication resources, improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of signaling for enabling erasure coding as described herein, or the processor 740 and the memory 730 may be otherwise configured to perform or support such operations.

Figure 8:
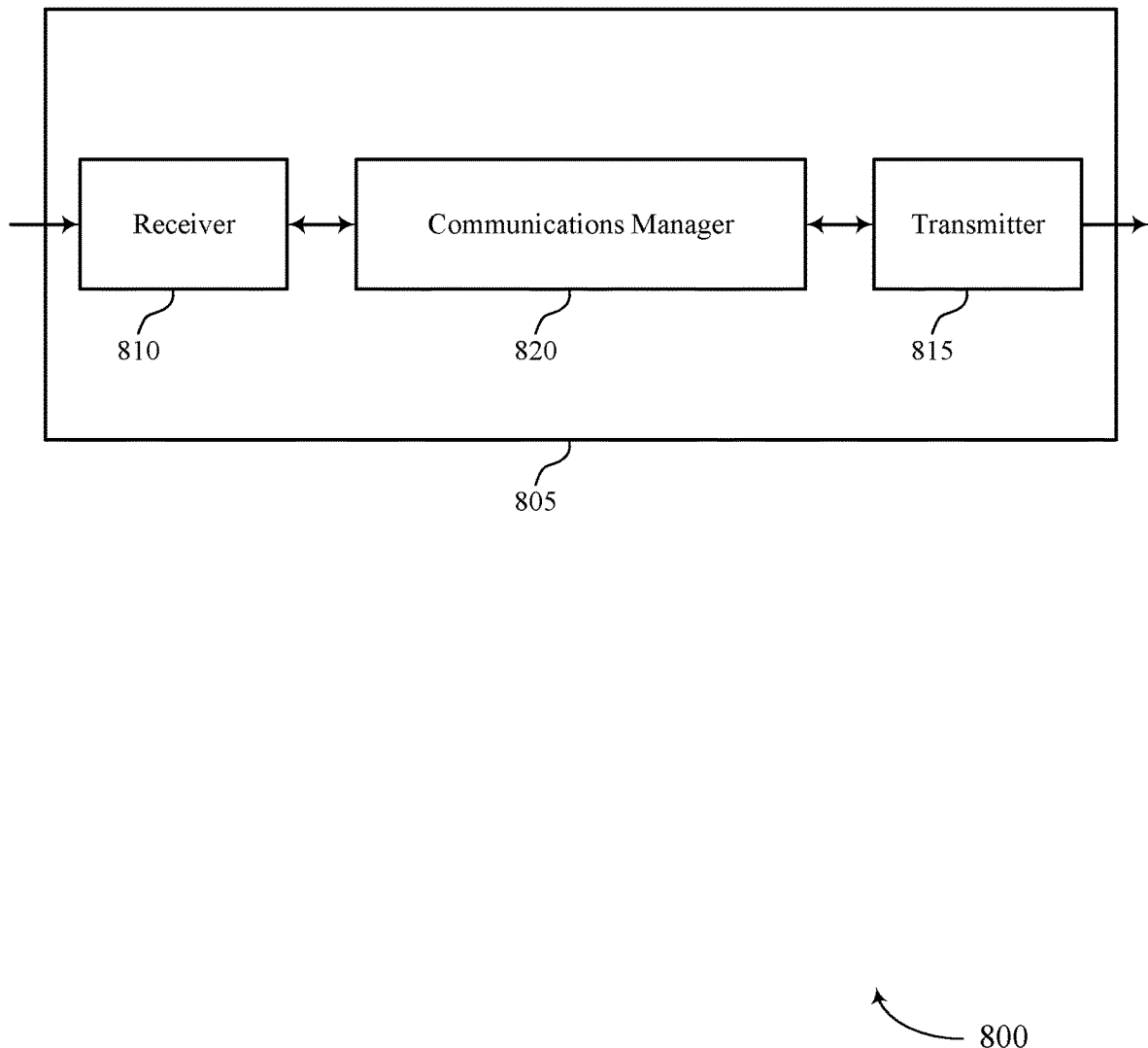
FIGS. 8 and 9 illustrate block diagrams of devices that support signaling for enabling erasure coding in accordance with one or more aspects of the present disclosure.

FIG. 8 illustrates a block diagram 800 of a device 805 that supports signaling for enabling erasure coding in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of signaling for enabling erasure coding as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network encoding device in accordance with examples as disclosed herein. For example, the communications manager 820 may be configured as or otherwise support a means for transmitting, an encoding capability message indicating one or more parameters associated with an erasure encoding and an erasure encoding type from a set of multiple defined erasure encoding types, where the erasure encoding type is associated with an order between the erasure encoding and a LDPC encoding. The communications manager 820 may be configured as or otherwise support a means for encoding data in accordance with the one or more parameters and the erasure encoding type indicated in the encoding capability message. The communications manager 820 may be configured as or otherwise support a means for transmitting a data message including the data encoded in accordance with the encoding capability message.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for network encoding which may result in reduced processing, reduced power consumption, and more efficient utilization of communication resources.

Figure 9:
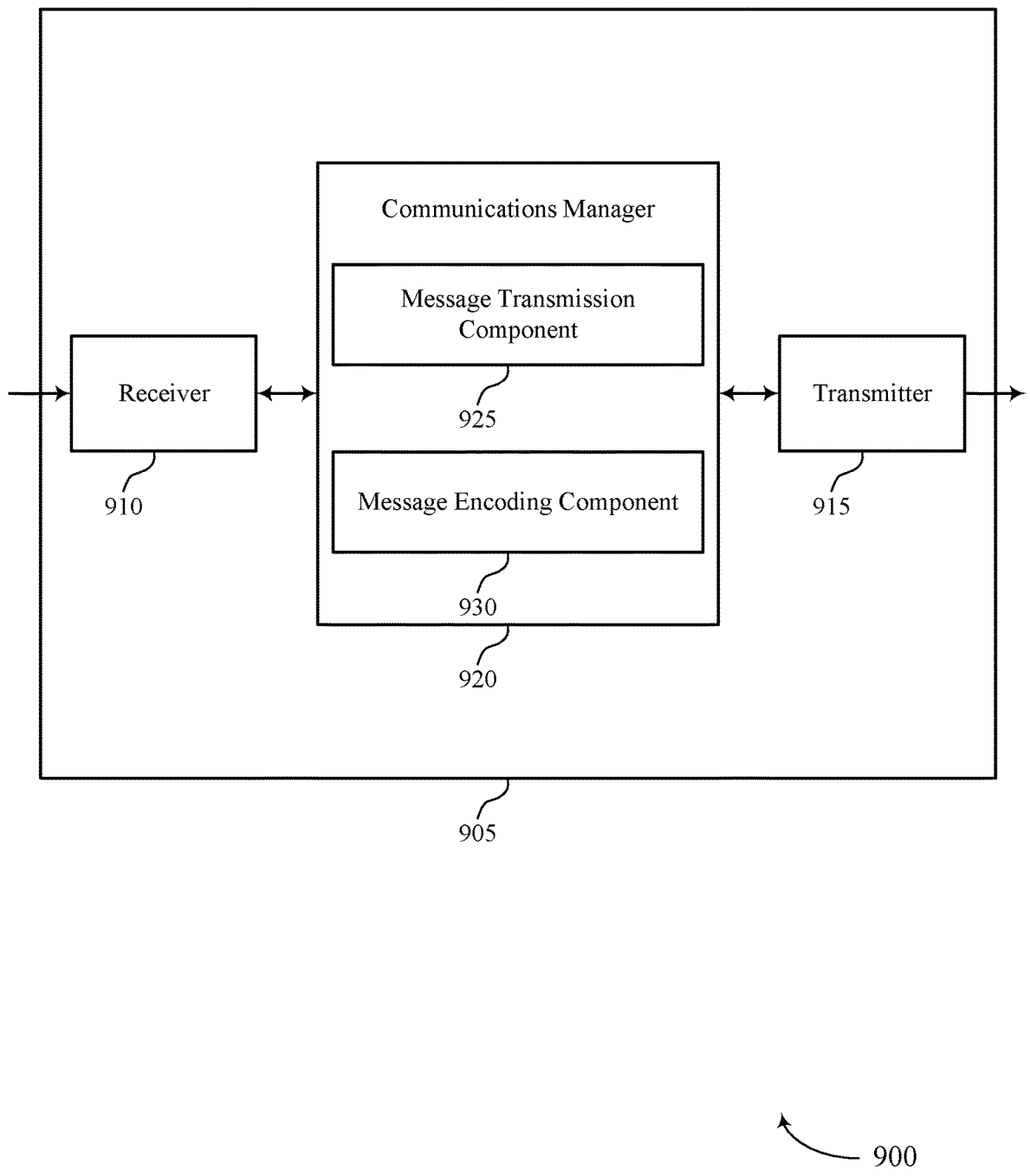

FIG. 9 illustrates a block diagram 900 of a device 905 that supports signaling for enabling erasure coding in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of signaling for enabling erasure coding as described herein. For example, the communications manager 920 may include a message transmission component 925 a message encoding component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network encoding device in accordance with examples as disclosed herein. The message transmission component 925 may be configured as or otherwise support a means for transmitting, an encoding capability message indicating one or more parameters associated with an erasure encoding and an erasure encoding type from a set of multiple defined erasure encoding types, where the erasure encoding type is associated with an order between the erasure encoding and a LDPC encoding. The message encoding component 930 may be configured as or otherwise support a means for encoding data in accordance with the one or more parameters and the erasure encoding type indicated in the encoding capability message. The message transmission component 925 may be configured as or otherwise support a means for transmitting a data message including the data encoded in accordance with the encoding capability message.

Figure 10:
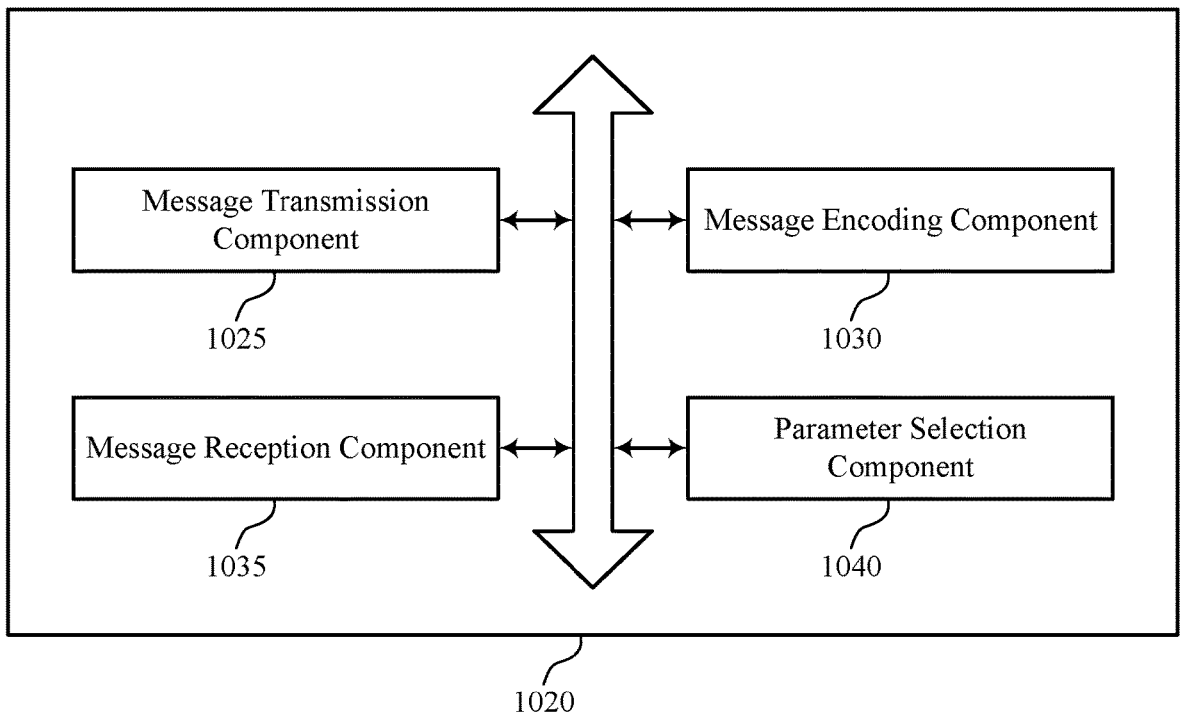
FIG. 10 illustrates a block diagram of a communications manager that supports signaling for enabling erasure coding in accordance with one or more aspects of the present disclosure.

FIG. 10 illustrates a block diagram 1000 of a communications manager 1020 that supports signaling for enabling erasure coding in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of signaling for enabling erasure coding as described herein. For example, the communications manager 1020 may include a message transmission component 1025, a message encoding component 1030, a message reception component 1035, a parameter selection component 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network encoding device in accordance with examples as disclosed herein. The message transmission component 1025 may be configured as or otherwise support a means for transmitting, an encoding capability message indicating one or more parameters associated with an erasure encoding and an erasure encoding type from a set of multiple defined erasure encoding types, where the erasure encoding type is associated with an order between the erasure encoding and a LDPC encoding. The message encoding component 1030 may be configured as or otherwise support a means for encoding data in accordance with the one or more parameters and the erasure encoding type indicated in the encoding capability message. In some examples, the message transmission component 1025 may be configured as or otherwise support a means for transmitting a data message including the data encoded in accordance with the encoding capability message.

In some examples, the erasure encoding type is a first erasure encoding type from the set of multiple defined erasure encoding types and, to support encoding the data of the data message, the message encoding component 1030 may be configured as or otherwise support a means for performing the erasure encoding prior to a LDPC encoding in accordance with the first erasure encoding type.

In some examples, the erasure encoding type is a second erasure encoding type from the set of multiple defined erasure encoding types and, to support encoding the data of the data message, the message encoding component 1030 may be configured as or otherwise support a means for performing a LDPC encoding prior to the erasure encoding in accordance with the second erasure encoding type.

In some examples, the message reception component 1035 may be configured as or otherwise support a means for receiving, from one or more wireless devices, respective decoding capability messages indicating a set of one or more erasure encoding types from a set of multiple erasure encoding types supported by a respective wireless device of the one or more wireless devices for decoding, where transmitting the encoding capability message is based on receiving the respective decoding capability messages.

In some examples, the respective decoding capability messages further include an indication of a power reception capability of the respective wireless device.

In some examples, to support receiving the respective decoding capability messages, the message reception component 1035 may be configured as or otherwise support a means for receiving, from a first wireless device, a first decoding capability message indicating support to decode data in accordance with a first erasure encoding type from the set of multiple defined erasure encoding types and a second erasure encoding type from the set of multiple defined erasure encoding types. In some examples, to support receiving the respective decoding capability messages, the message reception component 1035 may be configured as or otherwise support a means for receiving, from a second wireless device, a second decoding capability message indicating support to decode data in accordance with the first erasure encoding type where the erasure encoding type indicated in the encoding capability message is the first erasure encoding type based on the first wireless device and the second wireless device indicating capability to decode data in accordance with the first erasure encoding type.

In some examples, to support transmitting the encoding capability message, the message transmission component 1025 may be configured as or otherwise support a means for transmitting an indication that one or more resource pools are associated with respective erasure encoding types from the set of multiple defined erasure encoding types and respective sets of sidelink parameters, where the one or more resource pools are used for sidelink between a first wireless device and a second wireless device or the network encoding device.

In some examples, to support transmitting the encoding capability message, the message transmission component 1025 may be configured as or otherwise support a means for transmitting an indication that one or more frequency sub-bands are associated with respective erasure encoding types from the set of multiple defined erasure encoding types, where the one or more frequency sub-bands are used for communications between network encoding device and one or more wireless devices.

In some examples, the one or more parameters indicate a decoding order for the data. In some examples, the decoding order is based on data priority for code blocks or CBGs of the data and the erasure encoding type.

In some examples, the one or more parameters includes indicate the erasure encoding type.

In some examples, the one or more parameters indicate one or more coefficients associated with a second erasure encoding type from the set of multiple defined erasure encoding types, power control information associated with the second erasure encoding type, or both. In some examples, encoding the data is based on the one or more coefficients, the power control information, or both.

In some examples, to support selecting the one or more parameters associated with the erasure encoding and the erasure encoding type, the parameter selection component 1040 may be configured as or otherwise support a means for selecting, via L3 or L2, the one or more parameters. In some examples, to support selecting the one or more parameters associated with the erasure encoding and the erasure encoding type, the parameter selection component 1040 may be configured as or otherwise support a means for down selecting the one or more parameters from L3 or L2 to L2. In some examples, to support selecting the one or more parameters associated with the erasure encoding and the erasure encoding type, the parameter selection component 1040 may be configured as or otherwise support a means for configuring, via L1, the one or more parameters into a single set of parameters in L1.

In some examples, the data includes a set of blocks, and the message reception component 1035 may be configured as or otherwise support a means for receiving, from one or more first wireless devices, respective blocks that include the set of blocks, where encoding the data is based on receiving the respective blocks from the one or more first wireless devices. In some examples, the data includes a set of blocks, and the message transmission component 1025 may be configured as or otherwise support a means for transmitting, to one or more second wireless devices, the data message including the data based on receiving the respective blocks from the one or more first wireless devices.

Figure 11:
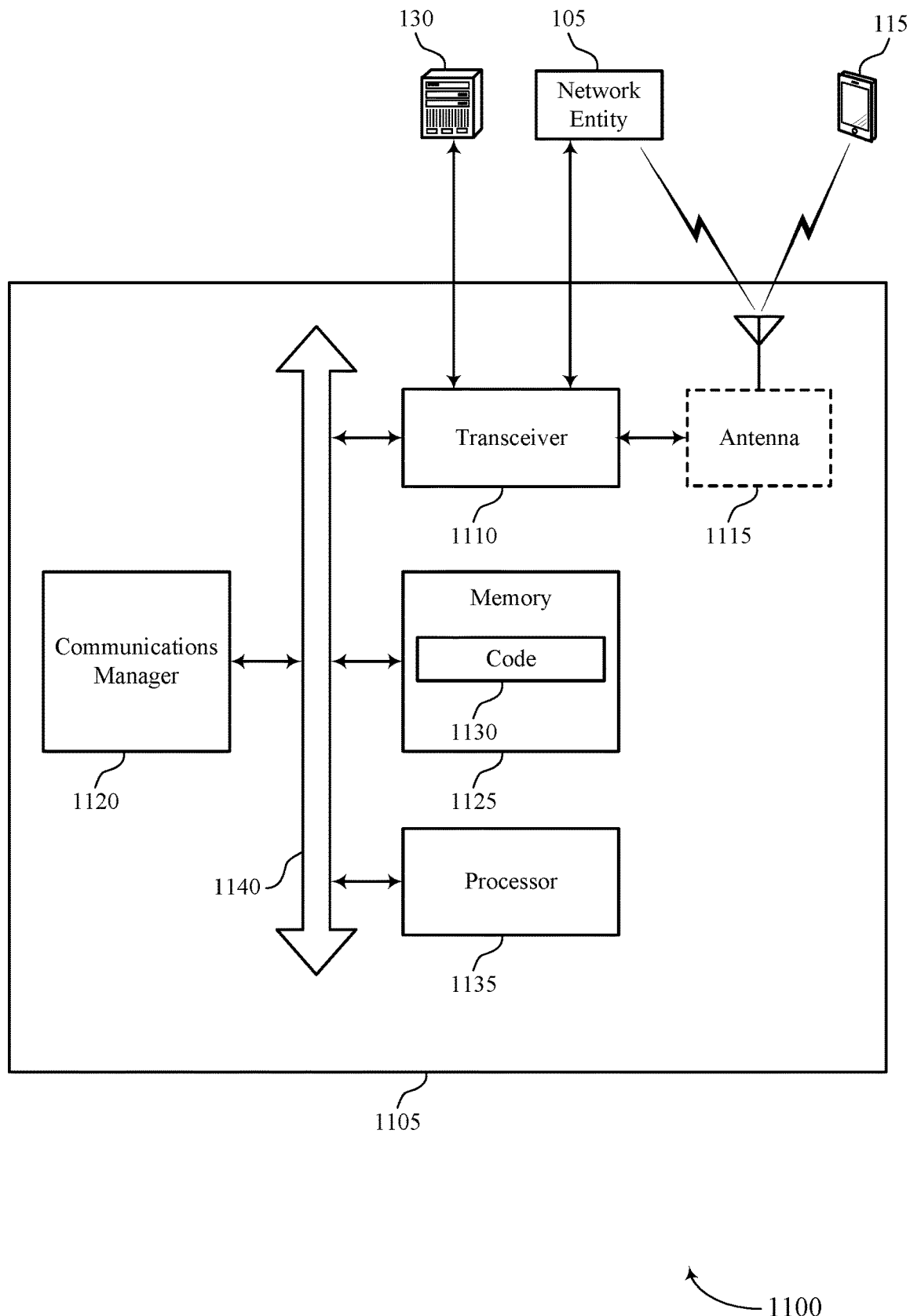
FIG. 11 illustrates a diagram of a system including a device that supports signaling for enabling erasure coding in accordance with one or more aspects of the present disclosure.

FIG. 11 illustrates a diagram of a system 1100 including a device 1105 that supports signaling for enabling erasure coding in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting signaling for enabling erasure coding). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network encoding device in accordance with examples as disclosed herein. For example, the communications manager 1120 may be configured as or otherwise support a means for transmitting, an encoding capability message indicating one or more parameters associated with an erasure encoding and an erasure encoding type from a set of multiple defined erasure encoding types, where the erasure encoding type is associated with an order between the erasure encoding and a LDPC encoding. The communications manager 1120 may be configured as or otherwise support a means for encoding data in accordance with the one or more parameters and the erasure encoding type indicated in the encoding capability message. The communications manager 1120 may be configured as or otherwise support a means for transmitting a data message including the data encoded in accordance with the encoding capability message.

By including or configuring the communications manager 1120 in accordance with examples as described herein, the device 1105 may support techniques for network encoding which may result in improved communication reliability, reduced latency, improved user experience related to reduced processing, reduced power consumption, more efficient utilization of communication resources, improved coordination between devices, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of signaling for enabling erasure coding as described herein, or the processor 1135 and the memory 1125 may be otherwise configured to perform or support such operations.

Figure 12:
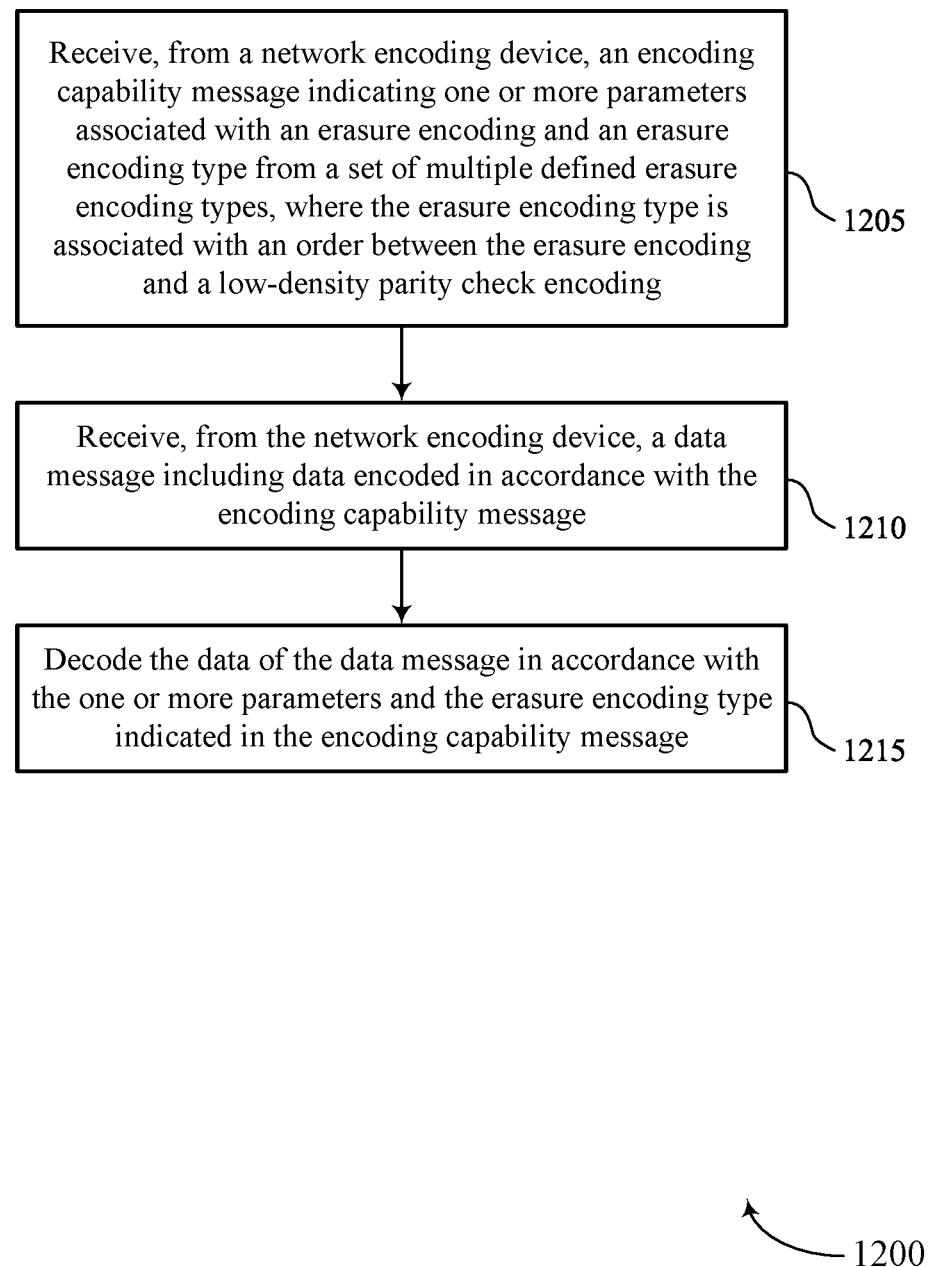
FIGS. 12 through 15 illustrate flowcharts showing methods that support signaling for enabling erasure coding in accordance with one or more aspects of the present disclosure.

FIG. 12 illustrates a flowchart illustrating a method 1200 that supports signaling for enabling erasure coding in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding. The operations of 1205 may be performed in accordance with examples as disclosed herein. In some examples, aspects of the operations of 1205 may be performed by a message reception component 625 as described with reference to FIG. 6.

At 1210, the method may include receiving, from the network encoding device, a data message including data encoded in accordance with the encoding capability message. The operations of 1210 may be performed in accordance with examples as disclosed herein. In some examples, aspects of the operations of 1210 may be performed by a message reception component 625 as described with reference to FIG. 6.

At 1215, the method may include decoding the data of the data message in accordance with the one or more parameters and the erasure encoding type indicated in the encoding capability message. The operations of 1215 may be performed in accordance with examples as disclosed herein. In some examples, aspects of the operations of 1215 may be performed by a message decoding component 630 as described with reference to FIG. 6.

Figure 13:
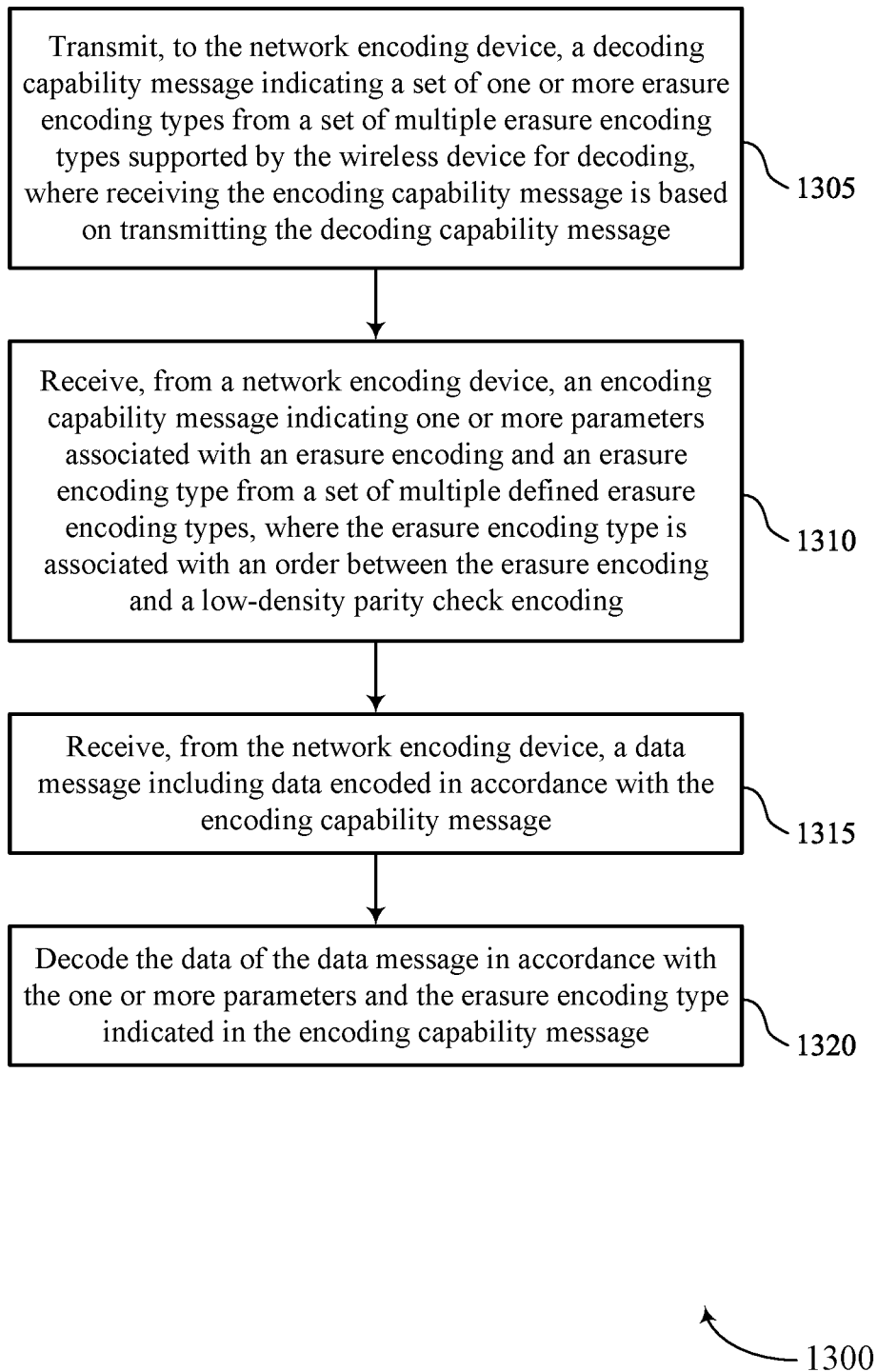

FIG. 13 illustrates a flowchart illustrating a method 1300 that supports signaling for enabling erasure coding in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, to the network encoding device, a decoding capability message indicating a set of one or more erasure encoding types from a set of multiple erasure encoding types supported by the wireless device for decoding, where receiving the encoding capability message is based on transmitting the decoding capability message. The operations of 1305 may be performed in accordance with examples as disclosed herein. In some examples, aspects of the operations of 1305 may be performed by a message transmission component 635 as described with reference to FIG. 6.

At 1310, the method may include receiving, from a network encoding device, an encoding capability message indicating one or more parameters associated with an erasure encoding and an erasure encoding type from a set of multiple defined erasure encoding types, where the erasure encoding type is associated with an order between the erasure encoding and a LDPC encoding. The operations of 1310 may be performed in accordance with examples as disclosed herein. In some examples, aspects of the operations of 1310 may be performed by a message reception component 625 as described with reference to FIG. 6.

At 1315, the method may include receiving, from the network encoding device, a data message including data encoded in accordance with the encoding capability message. The operations of 1315 may be performed in accordance with examples as disclosed herein. In some examples, aspects of the operations of 1315 may be performed by a message reception component 625 as described with reference to FIG. 6.

At 1320, the method may include decoding the data of the data message in accordance with the one or more parameters and the erasure encoding type indicated in the encoding capability message. The operations of 1320 may be performed in accordance with examples as disclosed herein. In some examples, aspects of the operations of 1320 may be performed by a message decoding component 630 as described with reference to FIG. 6.

Figure 14:
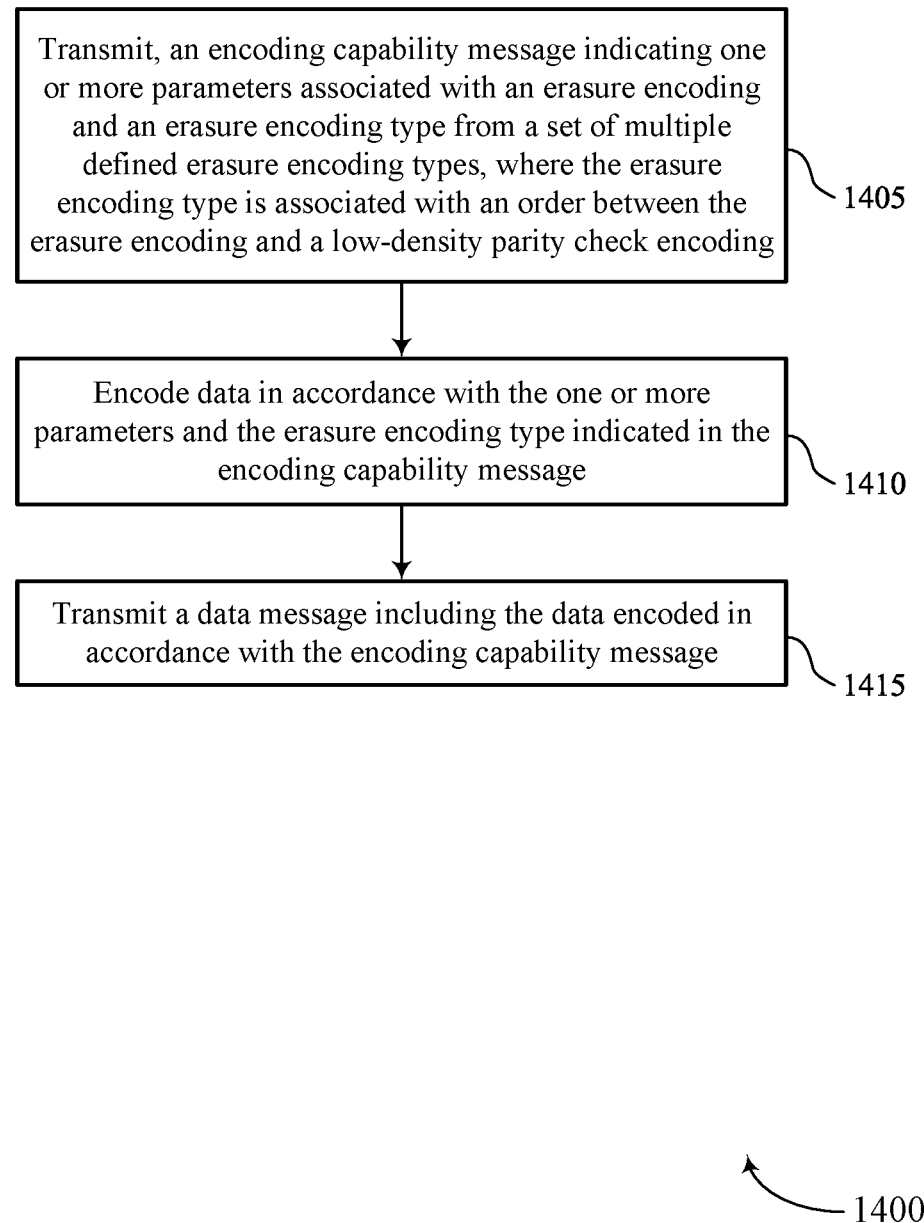

FIG. 14 illustrates a flowchart illustrating a method 1400 that supports signaling for enabling erasure coding in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, an encoding capability message indicating one or more parameters associated with an erasure encoding and an erasure encoding type from a set of multiple defined erasure encoding types, where the erasure encoding type is associated with an order between the erasure encoding and a LDPC encoding. The operations of 1405 may be performed in accordance with examples as disclosed herein. In some examples, aspects of the operations of 1405 may be performed by a message transmission component 1025 as described with reference to FIG. 10.

At 1410, the method may include encoding data in accordance with the one or more parameters and the erasure encoding type indicated in the encoding capability message. The operations of 1410 may be performed in accordance with examples as disclosed herein. In some examples, aspects of the operations of 1410 may be performed by a message encoding component 1030 as described with reference to FIG. 10.

At 1415, the method may include transmitting a data message including the data encoded in accordance with the encoding capability message. The operations of 1415 may be performed in accordance with examples as disclosed herein. In some examples, aspects of the operations of 1415 may be performed by a message transmission component 1025 as described with reference to FIG. 10.

Figure 15:
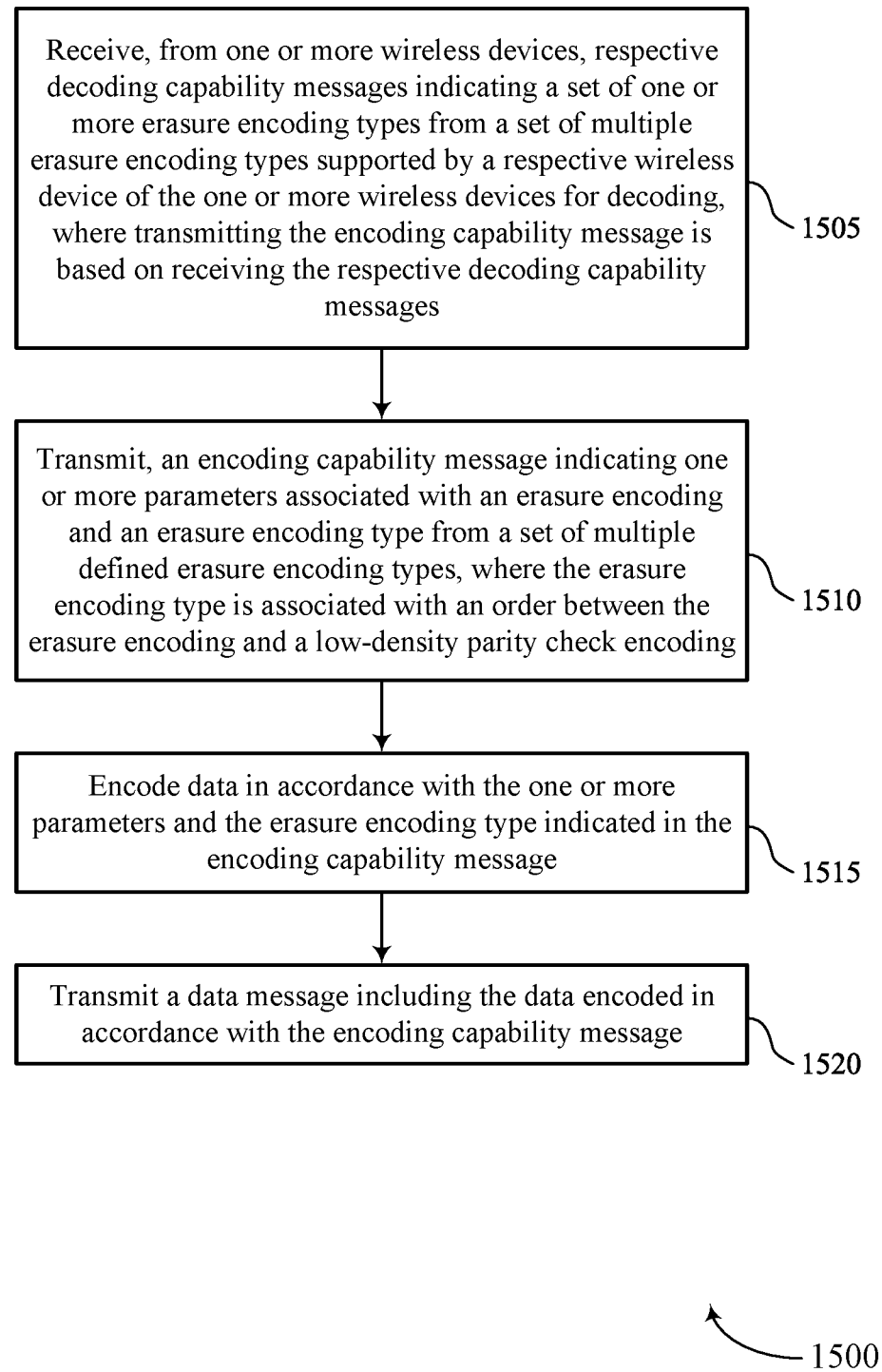

FIG. 15 illustrates a flowchart illustrating a method 1500 that supports signaling for enabling erasure coding in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from one or more wireless devices, respective decoding capability messages indicating a set of one or more erasure encoding types from a set of multiple erasure encoding types supported by a respective wireless device of the one or more wireless devices for decoding, where transmitting the encoding capability message is based on receiving the respective decoding capability messages. The operations of 1505 may be performed in accordance with examples as disclosed herein. In some examples, aspects of the operations of 1505 may be performed by a message reception component 1035 as described with reference to FIG. 10.

At 1510, the method may include transmitting, an encoding capability message indicating one or more parameters associated with an erasure encoding and an erasure encoding type from a set of multiple defined erasure encoding types, where the erasure encoding type is associated with an order between the erasure encoding and a LDPC encoding. The operations of 1510 may be performed in accordance with examples as disclosed herein. In some examples, aspects of the operations of 1510 may be performed by a message transmission component 1025 as described with reference to FIG. 10.

At 1515, the method may include encoding data in accordance with the one or more parameters and the erasure encoding type indicated in the encoding capability message. The operations of 1515 may be performed in accordance with examples as disclosed herein. In some examples, aspects of the operations of 1515 may be performed by a message encoding component 1030 as described with reference to FIG. 10.

At 1520, the method may include transmitting a data message including the data encoded in accordance with the encoding capability message. The operations of 1520 may be performed in accordance with examples as disclosed herein. In some examples, aspects of the operations of 1520 may be performed by a message transmission component 1025 as described with reference to FIG. 10.

The following provides an overview of aspects of the present disclosure:

Aspect 1: A method for wireless communications at a wireless device, comprising: receiving, from a network encoding device, an encoding capability message indicating one or more parameters associated with an erasure encoding and an erasure encoding type from a plurality of defined erasure encoding types, wherein the erasure encoding type is associated with an order between the erasure encoding and a LDPC encoding: receiving, from the network encoding device, a data message comprising data encoded in accordance with the encoding capability message: and decoding the data of the data message in accordance with the one or more parameters and the erasure encoding type indicated in the encoding capability message.

Aspect 2: The method of aspect 1, wherein the erasure encoding type is a first erasure encoding type from the plurality of defined erasure encoding types, and decoding the data of the data message comprises: performing an erasure decoding prior to a LDPC decoding in accordance with the first erasure encoding type.

Aspect 3: The method of any of aspects 1 through 2, wherein the erasure encoding type is a second erasure encoding type from the plurality of defined erasure encoding types, and decoding the data of the data message comprises: performing a LDPC decoding prior to an erasure decoding in accordance with the second erasure encoding type.

Aspect 4: The method of any of aspects 1 through 3, further comprising: transmitting, to the network encoding device, a decoding capability message indicating a set of one or more erasure encoding types from a plurality of erasure encoding types supported by the wireless device for decoding, wherein receiving the encoding capability message is based at least in part on transmitting the decoding capability message.

Aspect 5: The method of aspect 4, wherein the decoding capability message further comprises an indication of a power reception capability of the wireless device.

Aspect 6: The method of any of aspects 1 through 5, wherein receiving the encoding capability message further comprises: receiving an indication that one or more resource pools are associated with respective erasure encoding types from the plurality of defined erasure encoding types and respective sets of sidelink parameters, wherein the one or more resource pools are used for sidelink between the wireless device and a second wireless device or the network encoding device.

Aspect 7: The method of aspect 6, further comprising: communicating, with the second wireless device via a first resource pool of the one or more resource pools, using a set of sidelink parameters associated with the first resource pool.

Aspect 8: The method of any of aspects 6 through 7, wherein the respective erasure encoding types are a same respective erasure encoding type or different respective erasure encoding types, and the respective sets of sidelink parameters are a same set of sidelink parameters or different sets of sidelink parameters.

Aspect 9: The method of any of aspects 1 through 8, wherein receiving the encoding capability message further comprises: receiving an indication that one or more frequency sub-bands are associated with respective erasure encoding types from the plurality of defined erasure encoding types, wherein the one or more frequency sub-bands are used for communications between the wireless device and the network encoding device.

Aspect 10: The method of any of aspects 1 through 9, wherein the one or more parameters indicate a decoding order for the data, and the decoding order is based at least in part on data priority for code blocks or CBGs of the data and the erasure encoding type.

Aspect 11: The method of any of aspects 1 through 10, wherein the one or more parameters indicate the erasure encoding type, and decoding the data is based at least in part on the erasure encoding type.

Aspect 12: The method of any of aspects 1 through 11, wherein the one or more parameters indicate one or more coefficients associated with a second erasure encoding type from the plurality of defined erasure encoding types, power control information associated with the second erasure encoding type, or both, and decoding the data is based at least in part on the one or more coefficients, the power control information, or both.

Aspect 13: The method of any of aspects 1 through 12, wherein the erasure encoding type and the one or more parameters are based at least in part on a signal to interference and noise ratio for a channel established between the wireless device and network coding device, one or more characteristics of the channel, or both.

Aspect 14: The method of any of aspects 1 through 13, further comprising: receiving the encoding capability message via a control information message, a medium access control message, a radio resource control message, or a combination thereof.

Aspect 15: The method of any of aspects 1 through 14, wherein the wireless device comprises a UE or a network entity, and the network encoding device comprises a UE or a network entity.

Aspect 16: A method for wireless communications at a network encoding device, comprising: transmitting, an encoding capability message indicating one or more parameters associated with an erasure encoding and an erasure encoding type from a plurality of defined erasure encoding types, wherein the erasure encoding type is associated with an order between the erasure encoding and a LDPC encoding: encoding data in accordance with the one or more parameters and the erasure encoding type indicated in the encoding capability message: and transmitting a data message comprising the data encoded in accordance with the encoding capability message.

Aspect 17: The method of aspect 16, wherein the erasure encoding type is a first erasure encoding type from the plurality of defined erasure encoding types, and encoding the data of the data message comprises: performing the erasure encoding prior to a LDPC encoding in accordance with the first erasure encoding type.

Aspect 18: The method of any of aspects 16 through 17, wherein the erasure encoding type is a second erasure encoding type from the plurality of defined erasure encoding types, and encoding the data of the data message comprises: performing a LDPC encoding prior to the erasure encoding in accordance with the second erasure encoding type.

Aspect 19: The method of any of aspects 16 through 18, further comprising: receiving, from one or more wireless devices, respective decoding capability messages indicating a set of one or more erasure encoding types from a plurality of erasure encoding types supported by a respective wireless device of the one or more wireless devices for decoding, wherein transmitting the encoding capability message is based at least in part on receiving the respective decoding capability messages.

Aspect 20: The method of aspect 19, wherein the respective decoding capability messages further comprise an indication of a power reception capability of the respective wireless device.

Aspect 21: The method of any of aspects 19 through 20, wherein receiving the respective decoding capability messages further comprises: receiving, from a first wireless device, a first decoding capability message indicating support to decode data in accordance with a first erasure encoding type from the plurality of defined erasure encoding types and a second erasure encoding type from the plurality of defined erasure encoding types: and receiving, from a second wireless device, a second decoding capability message indicating support to decode data in accordance with the first erasure encoding type wherein the erasure encoding type indicated in the encoding capability message is the first erasure encoding type based at least in part on the first wireless device and the second wireless device indicating capability to decode data in accordance with the first erasure encoding type.

Aspect 22: The method of any of aspects 16 through 21, wherein transmitting the encoding capability message further comprises: transmitting an indication that one or more resource pools are associated with respective erasure encoding types from the plurality of defined erasure encoding types and respective sets of sidelink parameters, wherein the one or more resource pools are used for sidelink between a first wireless device and a second wireless device or the network encoding device.

Aspect 23: The method of any of aspects 16 through 22, wherein transmitting the encoding capability message further comprises: transmitting an indication that one or more frequency sub-bands are associated with respective erasure encoding types from the plurality of defined erasure encoding types, wherein the one or more frequency sub-bands are used for communications between network encoding device and one or more wireless devices.

Aspect 24: The method of any of aspects 16 through 23, wherein the one or more parameters indicate a decoding order for the data, and the decoding order is based at least in part on data priority for code blocks or CBGs of the data and the erasure encoding type.

Aspect 25: The method of any of aspects 16 through 24, wherein the one or more parameters comprises indicate the erasure encoding type.

Aspect 26: The method of any of aspects 16 through 25, wherein the one or more parameters indicate one or more coefficients associated with a second erasure encoding type from the plurality of defined erasure encoding types, power control information associated with the second erasure encoding type, or both, and encoding the data is based at least in part on the one or more coefficients, the power control information, or both.

Aspect 27: The method of any of aspects 16 through 26, wherein selecting the one or more parameters associated with the erasure encoding and the erasure encoding type comprises: selecting, via L3 or L2, the one or more parameters: down selecting the one or more parameters from L3 or L2 to L2; and configuring, via L1, the one or more parameters into a single set of parameters in L1.

Aspect 28: The method of any of aspects 16 through 27, wherein the data comprises a set of blocks, the method further comprising: receiving, from one or more first wireless devices, respective blocks that comprise the set of blocks, wherein encoding the data is based at least in part on receiving the respective blocks from the one or more first wireless devices; and transmitting, to one or more second wireless devices, the data message comprising the data based at least in part on receiving the respective blocks from the one or more first wireless devices.

Aspect 29: An apparatus for wireless communications at a wireless device, comprising a processor: memory coupled with the processor; and instructions stored in the memory and executable by the processor to cause the apparatus to perform a method of any of aspects 1 through 15.

Aspect 30: An apparatus for wireless communications at a wireless device, comprising at least one means for performing a method of any of aspects 1 through 15.

Aspect 31: A non-transitory computer-readable medium storing code for wireless communications at a wireless device, the code comprising instructions executable by a processor to perform a method of any of aspects 1 through 15.

Aspect 32: An apparatus for wireless communications at a network encoding device, comprising a processor: memory coupled with the processor; and instructions stored in the memory and executable by the processor to cause the apparatus to perform a method of any of aspects 16 through 28.

Aspect 33: An apparatus for wireless communications at a network encoding device, comprising at least one means for performing a method of any of aspects 16 through 28.

Aspect 34: A non-transitory computer-readable medium storing code for wireless communications at a network encoding device, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a wireless device, comprising:
   a processor;
   memory in electronic communication with the processor; and
   instructions stored in the memory, wherein the instructions are executable by the processor to:
      receive, from a network encoding device, an encoding capability message indicating one or more parameters associated with an erasure encoding and an erasure encoding type from a plurality of defined erasure encoding types, wherein the erasure encoding type is associated with an order between the erasure encoding and a low-density parity check encoding;
      transmit, to the network encoding device, a decoding capability message indicating a set of one or more erasure encoding types from a plurality of erasure encoding types supported by the wireless device for decoding, wherein receiving the encoding capability message is based at least in part on transmitting the decoding capability message;
      receive, from the network encoding device, a data message comprising data encoded in accordance with the encoding capability message; and
      decode the data of the data message in accordance with the one or more parameters and the erasure encoding type indicated in the encoding capability message.

2. The apparatus of claim 1, wherein the erasure encoding type is a first erasure encoding type from the plurality of defined erasure encoding types, and the instructions to decode the data of the data message are executable by the processor to:
   perform an erasure decoding prior to a low-density parity check decoding in accordance with the first erasure encoding type.

3. The apparatus of claim 1, wherein the erasure encoding type is a second erasure encoding type from the plurality of defined erasure encoding types, and the instructions to decode the data of the data message are executable by the processor to:
   perform a low-density parity check decoding prior to an erasure decoding in accordance with the second erasure encoding type.

4. The apparatus of claim 1, wherein the decoding capability message further comprises an indication of a power reception capability of the wireless device.

5. The apparatus of claim 1, wherein the instructions to receive the encoding capability message are further executable by the processor:
   receive an indication that one or more resource pools are associated with respective erasure encoding types from the plurality of defined erasure encoding types and respective sets of sidelink parameters, wherein the one or more resource pools are used for sidelink between the wireless device and a second wireless device or the network encoding device.

6. The apparatus of claim 5, wherein the instructions are further executable by the processor:
   communicating, with the second wireless device via a first resource pool of the one or more resource pools, used a set of sidelink parameters associated with the first resource pool.

7. The apparatus of claim 5, wherein the respective erasure encoding types are a same respective erasure encoding type or different respective erasure encoding types, and the respective sets of sidelink parameters are a same set of sidelink parameters or different sets of sidelink parameters.

8. The apparatus of claim 1, wherein the instructions to receive the encoding capability message are further executable by the processor to:
   receive an indication that one or more frequency sub-bands are associated with respective erasure encoding types from the plurality of defined erasure encoding types, wherein the one or more frequency sub-bands are used for communications between the wireless device and the network encoding device.

9. The apparatus of claim 1, wherein the one or more parameters indicate a decoding order for the data, and the decoding order is based at least in part on data priority for code blocks or code block groups of the data and the erasure encoding type.

10. The apparatus of claim 1, wherein the one or more parameters indicate the erasure encoding type, and decoding the data is based at least in part on the erasure encoding type.

11. The apparatus of claim 1, wherein the one or more parameters indicate one or more coefficients associated with a second erasure encoding type from the plurality of defined erasure encoding types, power control information associated with the second erasure encoding type, or both, and decoding the data is based at least in part on the one or more coefficients, the power control information, or both.

12. The apparatus of claim 1, wherein the erasure encoding type and the one or more parameters are based at least in part on a signal to interference and noise ratio for a channel established between the wireless device and network coding device, one or more characteristics of the channel, or both.

13. The apparatus of claim 1, wherein the instructions are further executable by the processor to:
receive the encoding capability message via a control information message, a medium access control message, a radio resource control message, or a combination thereof.

14. The apparatus of claim 1, wherein:
the wireless device comprises a user equipment (UE) or a network entity; and
the network encoding device comprises a UE or a network entity.

15. An apparatus for wireless communications at a network encoding device, comprising:
a processor;
memory in electronic communication with the processor; and
instructions stored in the memory, wherein the instructions are executable by the processor to:
transmit, an encoding capability message indicating one or more parameters associated with an erasure encoding and an erasure encoding type from a plurality of defined erasure encoding types, wherein the erasure encoding type is associated with an order between the erasure encoding and a low-density parity check encoding;
receive, from one or more wireless devices, respective decoding capability messages indicating a set of one or more erasure encoding types from a plurality of erasure encoding types supported by a respective wireless device of the one or more wireless devices for decoding, wherein transmitting the encoding capability message is based at least in part on receiving the respective decoding capability messages;
encode data in accordance with the one or more parameters and the erasure encoding type indicated in the encoding capability message; and
transmit a data message comprising the data encoded in accordance with the encoding capability message.

16. The apparatus of claim 15, wherein the erasure encoding type is a first erasure encoding type from the plurality of defined erasure encoding types, and the instructions to encode the data of the data message are executable by the processor to:
perform the erasure encoding prior to a low-density parity check encoding in accordance with the first erasure encoding type.

17. The apparatus of claim 15, wherein the erasure encoding type is a second erasure encoding type from the plurality of defined erasure encoding types, and the instructions to encode the data of the data message are executable by the processor to:
perform a low-density parity check encoding prior to the erasure encoding in accordance with the second erasure encoding type.

18. The apparatus of claim 15, wherein the respective decoding capability messages further comprise an indication of a power reception capability of the respective wireless device.

19. The apparatus of claim 15, wherein the instructions to receive the respective decoding capability messages are further executable by the processor to:
receive, from a first wireless device, a first decoding capability message indicating support to decode data in accordance with a first erasure encoding type from the plurality of defined erasure encoding types and a second erasure encoding type from the plurality of defined erasure encoding types; and
receive, from a second wireless device, a second decoding capability message indicating support to decode data in accordance with the first erasure encoding type wherein the erasure encoding type indicated in the encoding capability message is the first erasure encoding type based at least in part on the first wireless device and the second wireless device indicating capability to decode data in accordance with the first erasure encoding type.

20. The apparatus of claim 15, wherein the instructions to transmit the encoding capability message are further executable by the processor to:
transmit an indication that one or more resource pools are associated with respective erasure encoding types from the plurality of defined erasure encoding types and respective sets of sidelink parameters, wherein the one or more resource pools are used for sidelink between a first wireless device and a second wireless device or the network encoding device.

21. The apparatus of claim 15, wherein the instructions to transmit the encoding capability message are further executable by the processor to:
transmit an indication that one or more frequency sub-bands are associated with respective erasure encoding types from the plurality of defined erasure encoding types, wherein the one or more frequency sub-bands are used for communications between network encoding device and one or more wireless devices.

22. The apparatus of claim 15, wherein the one or more parameters indicate a decoding order for the data, and the decoding order is based at least in part on data priority for code blocks or code block groups of the data and the erasure encoding type.

23. The apparatus of claim 15, wherein the one or more parameters comprises indicate the erasure encoding type.

24. The apparatus of claim 15, wherein the one or more parameters indicate one or more coefficients associated with a second erasure encoding type from the plurality of defined erasure encoding types, power control information associated with the second erasure encoding type, or both, and encoding the data is based at least in part on the one or more coefficients, the power control information, or both.

25. The apparatus of claim 15, wherein the instructions to select the one or more parameters associated with the erasure encoding and the erasure encoding type are executable by the processor to:
select, via layer 3 or layer 2, the one or more parameters;
down select the one or more parameters from layer 3 or layer 2 to layer 2; and
configuring, via layer 1, the one or more parameters into a single set of parameters in layer 1.

26. The apparatus of claim 15, wherein the data comprises a set of blocks, and the instructions are further executable by the processor to:

receive, from one or more first wireless devices, respective blocks that comprise the set of blocks, wherein encoding the data is based at least in part on receiving the respective blocks from the one or more first wireless devices; and transmit, to one or more second wireless devices, the data message comprising the data based at least in part on receiving the respective blocks from the one or more first wireless devices.

27. A method for wireless communications at a wireless device, comprising:

receiving, from a network encoding device, an encoding capability message indicating one or more parameters associated with an erasure encoding and an erasure encoding type from a plurality of defined erasure encoding types, wherein the erasure encoding type is associated with an order between the erasure encoding and a low-density parity check encoding;

receiving, from the network encoding device, a data message comprising data encoded in accordance with the encoding capability message; and decoding the data of the data message in accordance with the one or more parameters and the erasure encoding type indicated in the encoding capability message.

28. A method for wireless communications at a network encoding device, comprising:

transmitting, an encoding capability message indicating one or more parameters associated with an erasure encoding and an erasure encoding type from a plurality of defined erasure encoding types, wherein the erasure encoding type is associated with an order between the erasure encoding and a low-density parity check encoding;

encoding data in accordance with the one or more parameters and the erasure encoding type indicated in the encoding capability message; and transmitting a data message comprising the data encoded in accordance with the encoding capability message.

* * * * *